US007741617B2

(12) United States Patent
Matthews et al.

(10) Patent No.: US 7,741,617 B2
(45) Date of Patent: Jun. 22, 2010

(54) FLUID TREATMENT SYSTEM

(75) Inventors: Brent Matthews, London (CA); Jason Cerny, London (CA); Bradley Pusching, London (CA)

(73) Assignee: Trojan Technologies (CA)

(*) Notice: Subject to any disclaimer, the term of this patent is extended or adjusted under 35 U.S.C. 154(b) by 339 days.

(21) Appl. No.: 11/691,842

(22) Filed: Mar. 27, 2007

(65) Prior Publication Data

US 2007/0284540 A1    Dec. 13, 2007

Related U.S. Application Data

(60) Provisional application No. 60/786,358, filed on Mar. 28, 2006.

(51) Int. Cl.
*C02F 1/32* (2006.01)
*C02F 9/12* (2006.01)

(52) U.S. Cl. ............... 250/455.11; 250/453.11; 250/454.11; 210/85; 210/86; 210/87; 210/198.1; 210/209; 422/24; 422/186.3; 422/261

(58) Field of Classification Search ............... None
See application file for complete search history.

(56) References Cited

U.S. PATENT DOCUMENTS

| | | | | |
|---|---|---|---|---|
| 5,372,781 A | * | 12/1994 | Hallett et al. | 422/186.3 |
| 5,422,487 A | * | 6/1995 | Sauska et al. | 250/436 |
| 5,505,912 A | * | 4/1996 | Hallett | 422/186.3 |
| 5,573,666 A | * | 11/1996 | Korin | 210/232 |
| 5,597,482 A | * | 1/1997 | Melyon | 210/209 |
| 5,660,719 A | * | 8/1997 | Kurtz et al. | 210/85 |
| 5,660,802 A | * | 8/1997 | Archer et al. | 422/261 |
| 5,698,091 A | * | 12/1997 | Kuennen et al. | 210/87 |
| 5,958,251 A | * | 9/1999 | Przybilla et al. | 210/748 |
| 6,139,726 A | * | 10/2000 | Greene | 210/94 |
| 6,193,894 B1 | * | 2/2001 | Hollander | 210/748 |
| 6,264,836 B1 | * | 7/2001 | Lantis | 210/188 |
| 6,533,930 B1 | * | 3/2003 | Kool et al. | 210/198.1 |
| 6,578,991 B2 | * | 6/2003 | Beaumont | 362/345 |

(Continued)

FOREIGN PATENT DOCUMENTS

CA      2061424 A1    8/1993

(Continued)

OTHER PUBLICATIONS

International Search Report for International Application No. PCT/CA2007/000495.

*Primary Examiner*—David A Vanore
(74) *Attorney, Agent, or Firm*—Katten Muchin Rosenman LLP

(57) ABSTRACT

There is disclosed a fluid treatment device comprising a housing for receiving a flow of fluid. The housing comprises a fluid inlet, a fluid outlet, a closed fluid treatment zone disposed between the fluid inlet and the fluid outlet. Disposed in the housing is at least one elongate radiation source assembly having a longitudinal axis disposed in the fluid treatment zone substantially parallel to a direction of the flow of fluid through the housing. The radiation source assembly comprises an elongate radiation source disposed in a protective sleeve to define a substantially annular passageway. The protective sleeve has opposed open ends configured to permit heat to exit the passageway and the housing through at least one of the opposed open ends of the sleeve.

29 Claims, 31 Drawing Sheets

U.S. PATENT DOCUMENTS

| | | | |
|---|---|---|---|
| 6,793,817 B2 * | 9/2004 | Kuennen et al. | 210/232 |
| 6,949,185 B2 * | 9/2005 | Woodard et al. | 210/198.1 |
| 7,081,225 B1 * | 7/2006 | Hollander | 422/24 |
| 7,166,216 B2 * | 1/2007 | Woodard et al. | 210/232 |
| 7,175,317 B2 * | 2/2007 | Beaumont | 362/345 |
| 7,250,610 B1 * | 7/2007 | Cox et al. | 250/455.11 |
| 7,351,336 B2 * | 4/2008 | Nguyen et al. | 210/205 |
| 2006/0006339 A1 * | 1/2006 | Fraser et al. | 250/372 |

FOREIGN PATENT DOCUMENTS

| | | |
|---|---|---|
| CA | 2295944 A1 | 1/1999 |

* cited by examiner

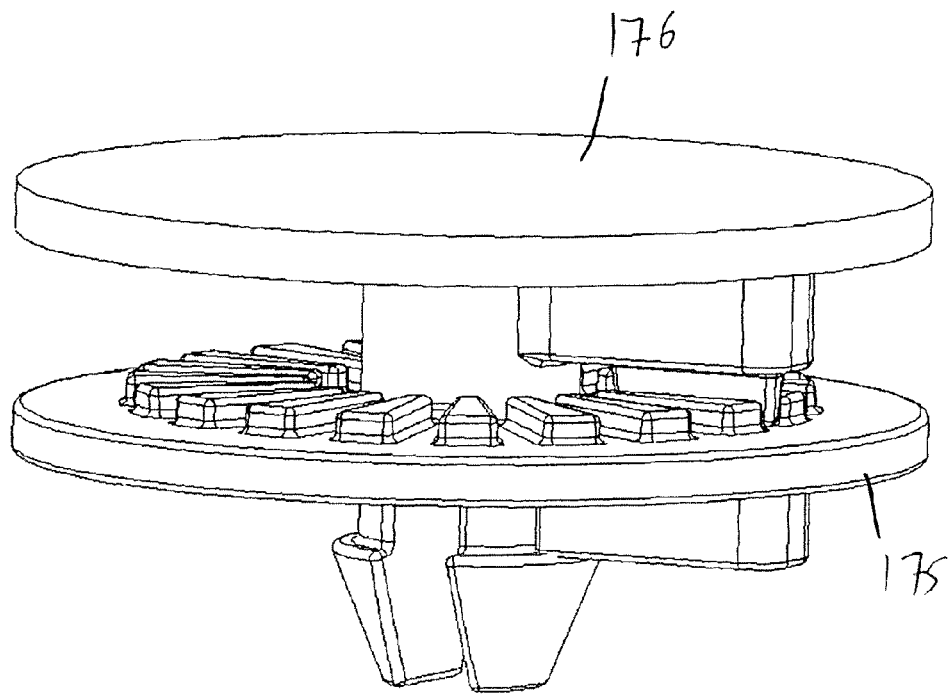
FIG. 28
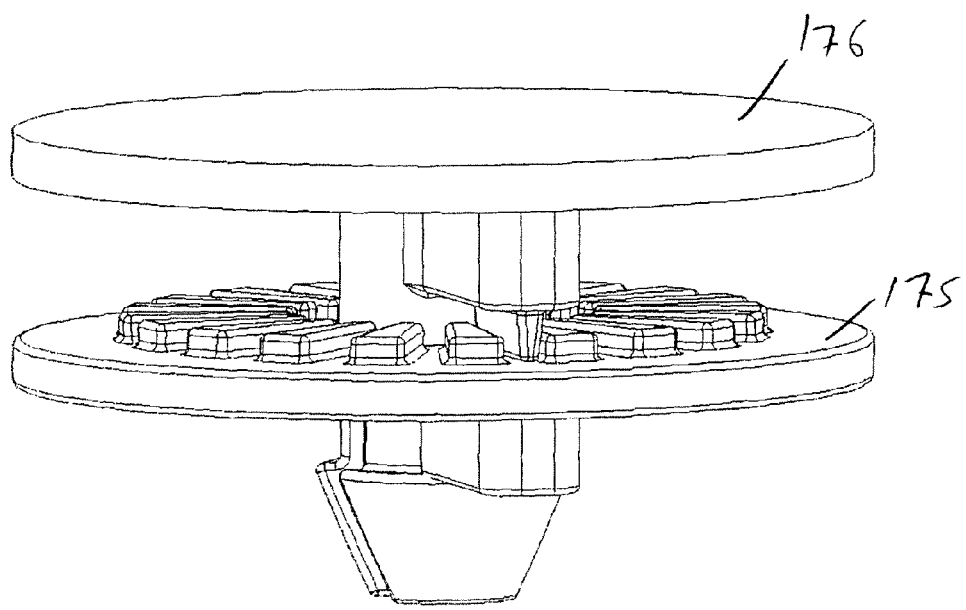

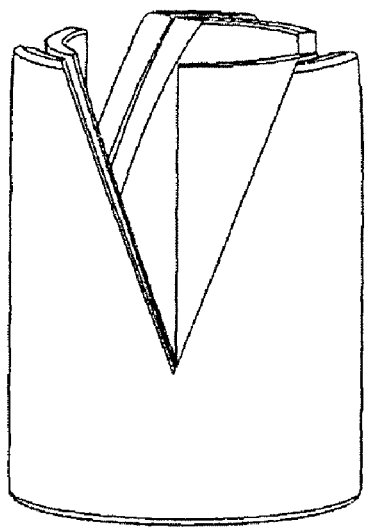
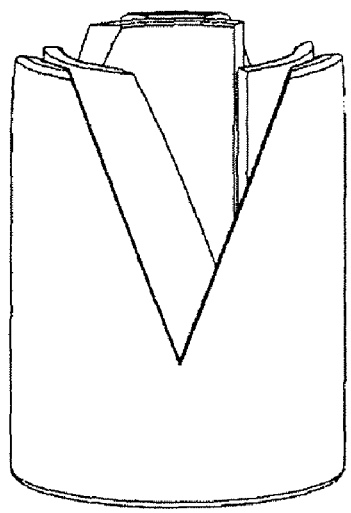
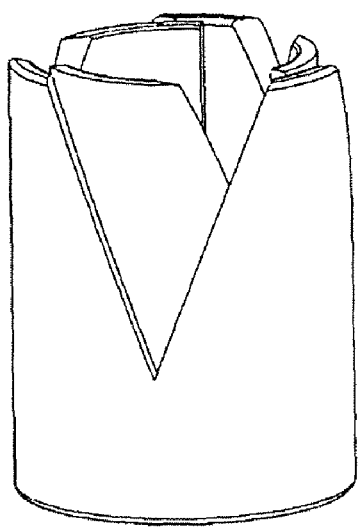
FIG 29

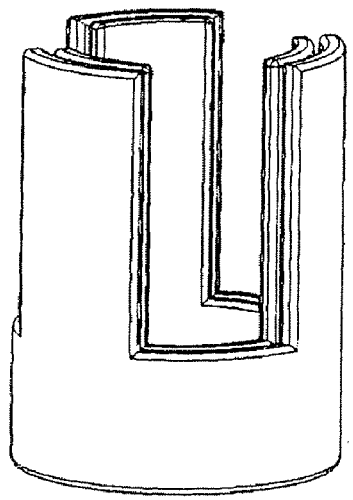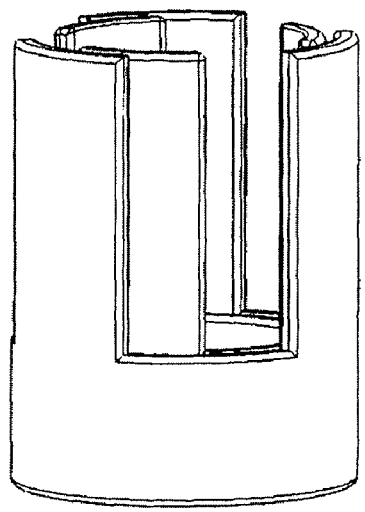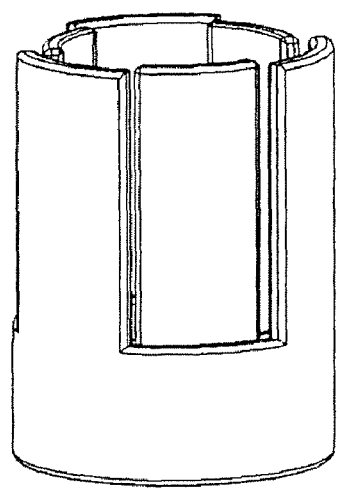
FIG 30

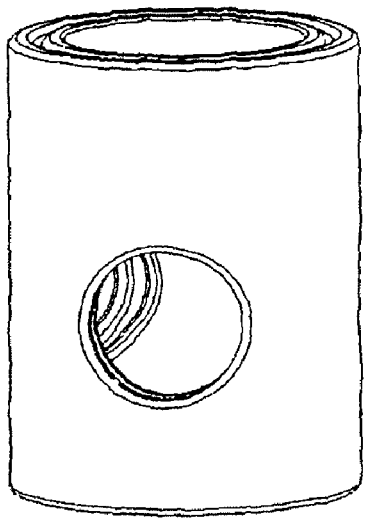
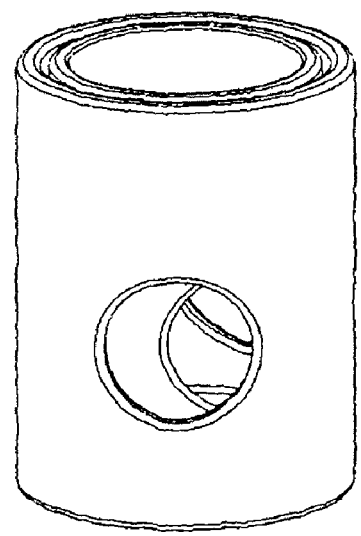
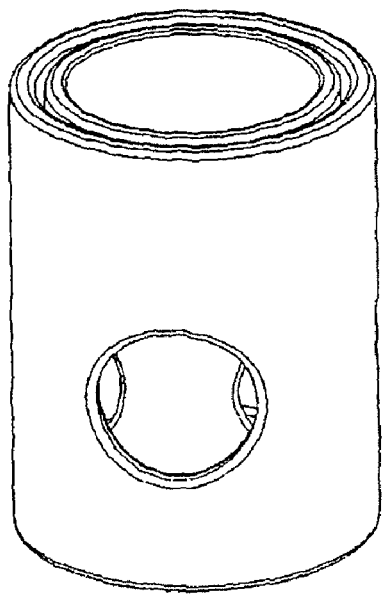
FIG 31

FLUID TREATMENT SYSTEM

CROSS-REFERENCE TO RELATED APPLICATION

The present application claims the benefit under 35 U.S.C. §119(e) of provisional patent application Ser. No. 60/786,358, filed Mar. 28, 2006, the contents of which are hereby incorporated by reference.

BACKGROUND OF THE INVENTION

1. Field of the Invention

The present invention relates to a fluid treatment device. More particularly, in its preferred embodiment, the present invention relates to an ultraviolet radiation water treatment device.

2. Description of the Prior Art

Fluid treatment devices and systems are known. For example, U.S. Pat. Nos. 4,482,809, 4,872,980, 5,006,244 and 5,590,390 (all assigned to the assignee of the present invention) all describe gravity fed fluid treatment systems which employ ultraviolet (UV) radiation to inactivate microorganisms present in the fluid.

The devices and systems described in the '809, '980 and '244 patents generally include several UV lamps each of which are mounted within sleeves extending between two support arms of the frames. The frames are immersed into the fluid to be treated which is then irradiated as required. The amount of radiation to which the fluid is exposed is determined by the proximity of the fluid to the lamps. One or more UV sensors may be employed to monitor the UV output of the lamps and the fluid level is typically controlled, to some extent, downstream of the treatment device by means of level gates or the like. Since, at higher flow rates, accurate fluid level control is difficult to achieve in gravity fed systems, fluctuations in fluid level are inevitable. Such fluctuations could lead to non-uniform irradiation in the treated fluid.

So-called closed fluid treatment devices are known—see, for example, U.S. Pat. No. 5,504,335 (assigned to the assignee of the present invention). The '335 patent teaches a closed fluid treatment device comprising a housing for receiving a flow of fluid. The housing comprises a fluid inlet, a fluid outlet, a fluid treatment zone disposed between the fluid inlet and the fluid outlet, and at least one radiation source module disposed in the fluid treatment zone. The fluid inlet, the fluid outlet and the fluid treatment zone are in a collinear relationship with respect to one another. The at least one radiation source module comprises a radiation source sealably connected to a leg which is sealably mounted to the housing. The radiation source is disposed substantially parallel to the flow of fluid. The radiation source module is removable through an aperture provided in the housing intermediate to fluid inlet and the fluid outlet thereby obviating the need to physically remove the device for service of the radiation source. A disadvantage with this kind of closed fluid treatment device is that the seal between the radiation source module and the housing must be broken each time the former is to be serviced. This confers additional cost and complexity to the servicing needs of the device.

U.S. Pat. No. 6,500,346 (assigned to the assignee of the present invention) teaches a fluid treatment device, particularly useful for ultraviolet radiation treatment of fluids such as water. The device comprises a housing for receiving a flow of fluid. The housing has a fluid inlet, a fluid outlet, a fluid treatment zone disposed between the fluid inlet and the fluid outlet and at least one radiation source having a longitudinal axis disposed in the fluid treatment zone substantially transverse to a direction of the flow of fluid through the housing. The fluid inlet, the fluid outlet and the fluid treatment zone are arranged substantially collinearly with respect to one another. The fluid inlet has a first opening having: (i) a cross-sectional area less than a cross-sectional area of the fluid treatment zone, and (ii) a largest diameter substantially parallel to the longitudinal axis of the at least one radiation source assembly.

Many of the above mentioned fluid treatment systems have achieved significant commercial success in the treatment of municipal waste water and/or municipal drinking water.

In certain cases, it would be desirable to have a fluid treatment system for use in treating relatively low volumes of water—e.g., for domestic use, for use in an office environment, etc.

In this regard, reference may be made to:
U.S. Pat. No. 4,179,616,
U.S. Pat. No. 5,471,063 (assigned to the assignee of the present invention),
U.S. Pat. NO. 6,139,726,
U.S. Pat. No. 6,679,068, and
U.S. Pat. No. 6,832,844.

The '063 patent teaches fluid disinfection unit comprising a fluid treatment housing, an electrical supply module and electrical connection means connecting the fluid treatment housing and the electrical supply module. The fluid treatment housing comprises a fluid inlet and a fluid outlet in communication with a reaction chamber, an ultraviolet radiation lamp disposed in the reaction chamber and having a first electrical connector at a first end thereof and a second end thereof being closed. The second end of the ultraviolet radiation lamp is received and held in place by tapered, helical spring. The electrical supply module comprises ballast and which may be removably connected to the ultraviolet radiation lamp and the electrical supply module.

The device taught by the '063 patent has been commercially available from Trojan Technologies Inc. under the tradename Trojan UVMax™ and has achieved commercially success. Notwithstanding this, there is room for improvement.

One of the problems with devices such as those taught by the '063 patent is fluctuation in the environment surrounding the radiation source. This occurs primarily due to the fact that the temperature of the fluid (typically water) surrounding lamp is variable. The variability in temperature can occur to variability of the temperature of the fluid entering the fluid treatment system. Further, the variability of the temperature can occur due to fluid resting in the system when the system is in a non-flowing condition. Since the radiation source is constantly powered, fluid resting in the system will become relatively warmer (i.e., as compared to when fluid is passing through the system) thereby increasing the temperature of the environment around the radiation source.

In recent years, improvements in radiation source (e.g., lamp) technology have developed to the point that radiation sources are designed to operate at an optimum temperature—e.g., for achieving specified disinfection levels and the like. It is important to optimally control the temperature surrounding the radiation source to maintain optimum operation of the radiation source.

Further, over the years, the art has transitioned toward the use of protective sleeves for radiation lamps, wherein the protective sleeves an open end and a closed end thereby facilitating sealing of the radiation lamp—this is particularly important in water submersible systems.

Accordingly, it would be highly desirable to have a fluid treatment system in which the temperature of the environment surrounding the radiation source is relatively constant. More particularly, it would be highly desirable to have a fluid treatment system in which the occurrence of resting fluid described above and fluid temperature fluctuations had little or no effect on the operating temperature of the radiation source.

SUMMARY OF THE INVENTION

It is an object of the present invention to obviate or mitigate at least one of the above-mentioned disadvantages of the prior art.

It is another object of the present invention to provide a novel fluid treatment system.

Accordingly, in one of its aspects, the present invention provides a fluid treatment device comprising a housing for receiving a flow of fluid, the housing comprising a fluid inlet, a fluid outlet, a closed fluid treatment zone disposed between the fluid inlet and the fluid outlet, and at least one elongate radiation source assembly having a longitudinal axis disposed in the fluid treatment zone substantially parallel to a direction of the flow of fluid through the housing;

wherein the radiation source assembly comprises an elongate radiation source disposed in a protective sleeve to define a substantially annular passageway, the protective sleeve having opposed open ends configured to permit heat to exit the passageway and the housing through at least one of the opposed open ends of the sleeve.

Thus, the present inventors have discovered a fluid treatment system in which performance of the radiation source and temperature of the fluid being treated are not dependent on one another. This is achieved by having a gap, preferably an annular gap between the radiation source and a protective sleeve that is open at both ends. The open nature of the protective sleeve allows for heat build-up in the gap to be dissipated or otherwise vent thereby allowing the radiation source to operate in an optimal manner. Put another way, the gap between the radiation source and the protective sleeve serves as an insulative barrier between the radiation source and the fluid being treated thereby decoupling performance of the radiation source and the temperature of the fluid being treated.

Dissipation of the heat build up from the gap can occur by natural forces of convection and/or by use of auxiliary means such as a fan and the like facilitate dissipation of the heat build up. Preferably, the radiation source comprises an electrical connection at a proximal portion thereof and the combination of the radiation source and protective sleeve are configured so that dissipation of at least a portion of the heat build up from the annular gap occurs in a direction toward the distal portion of the radiation source (i.e., opposite to the end of the radiation source that comprises the electrical connection). Such distal portion cooling of the radiation source is particular advantageous if a metal-amalgam (preferably mercury-amalgam) composition is disposed in the distal portion of the radiation source.

Preferably, the fluid treatment system is in the form of a water treatment system. Preferably, the radiation source in is an ultraviolet radiation lamp, more preferably a metal-amalgam containing ultraviolet radiation lamp.

BRIEF DESCRIPTION OF THE DRAWINGS

Embodiments of the present invention will be described with reference to the accompanying drawings, wherein like reference numerals denote like parts, and in which:

FIGS. 25-28 illustrate various views of a second embodiment of an arrangement for varying the size of the window of the locator element used at the distal portion of the radiation lamp; and FIGS. 29-31 illustrate various embodiments of alternative arrangements to vary the size of the window positioned adjacent to the metal-amalgam (e.g., mercury amalgam) composition in the radiation lamp used in the fluid treatment system illustrated in FIGS. 1-4.

DETAILED DESCRIPTION OF THE PREFERRED EMBODIMENTS

Figure 1:
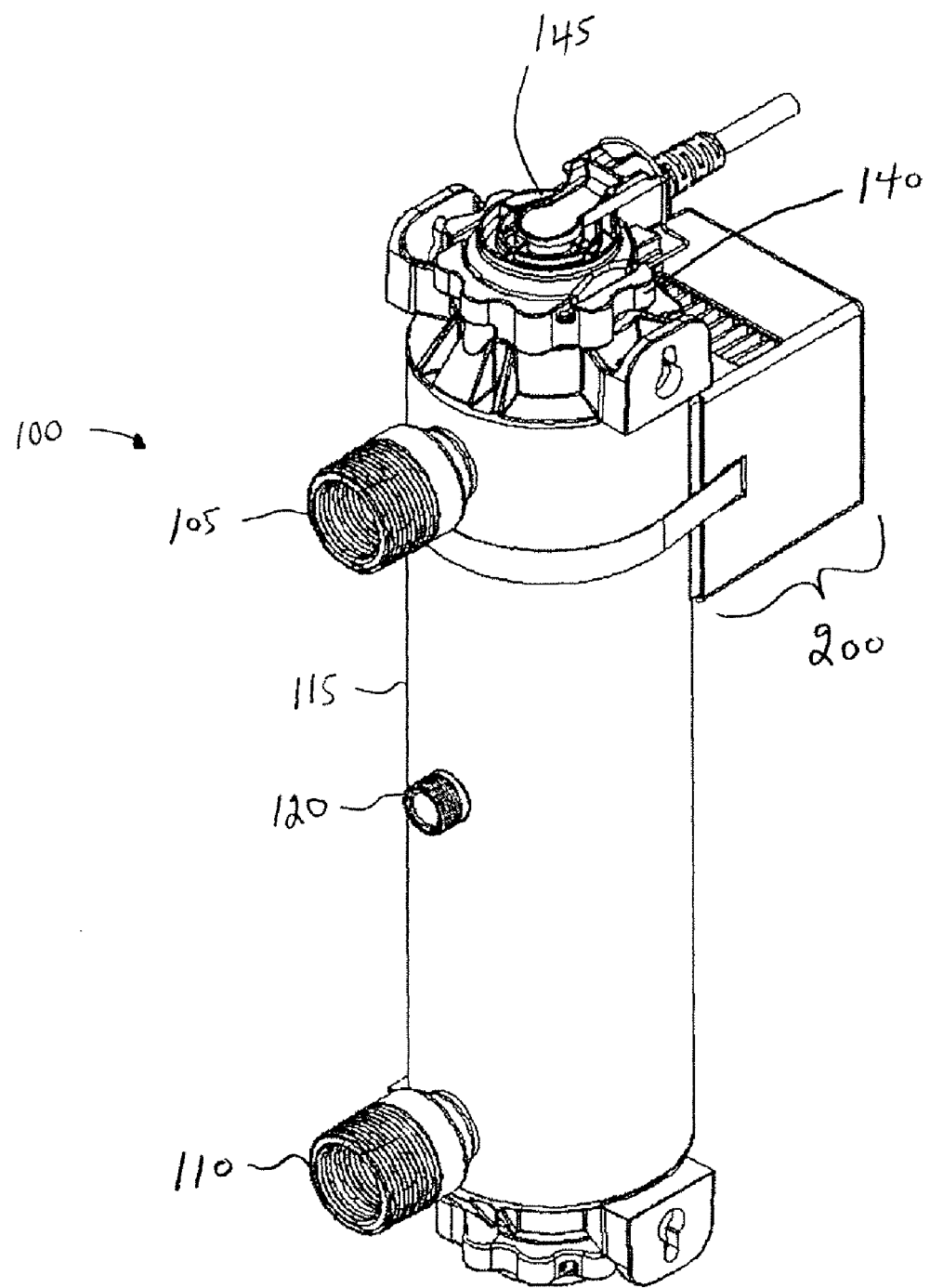
FIG. 1 illustrates a perspective view of a preferred embodiment of the present fluid treatment system.

With reference to FIG. 1, there is illustrated a fluid treatment system 100 comprising a pair of threaded ports 105,110. One of ports 105,110 acts as fluid inlet while the other acts as a fluid outlet.

Ports 105,110 are connected to a fluid treatment chamber 115. Fluid treatment chamber 115 may be constructed from stainless steel or any other suitable material. Disposed in fluid treatment chamber 115 is a threaded port 120 for receiving an optical radiation sensor (not shown).

Figure 2:
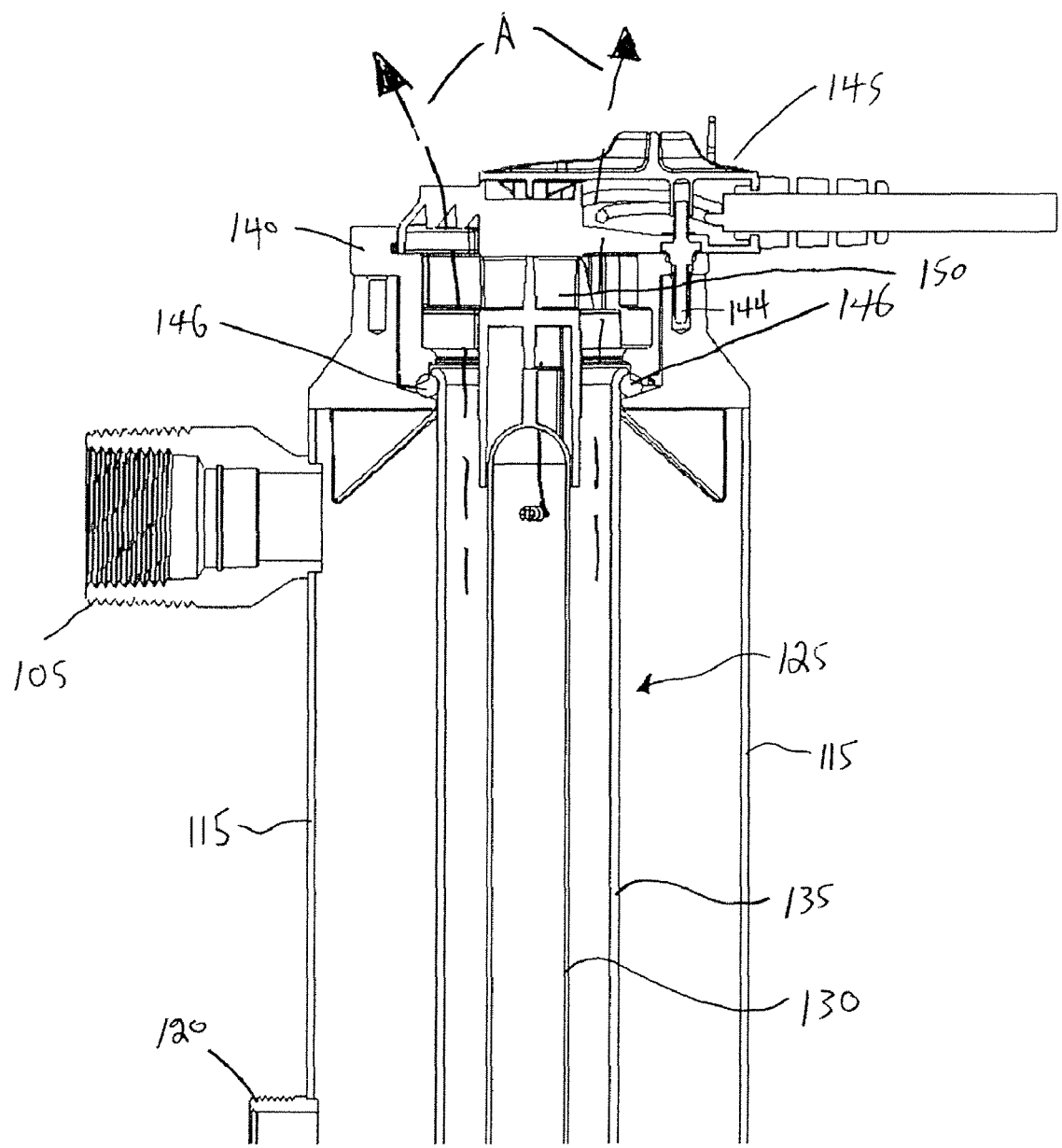
FIG. 2 illustrates an enlarged sectional view of an upper portion of fluid treatment system illustrated in FIG. 1.

With reference to FIGS. 1-2, disposed within chamber 115 is a radiation source assembly 125. Radiation source assembly 125 comprises a radiation lamp 130 disposed within a radiation transparent, protective sleeve 135. Protective sleeve 135 is open at both ends. A sleeve bolt 140 is used to secure radiation source assembly 125 in housing 115 and to position radiation source assembly 125 for connection to an electrical connection harness 145.

As illustrated, the wire conduit emanating from electrical connection harness points away from threaded port 120. This avoids a situation where such wire conduit might interfere with servicing and/or replacement of the optical radiation sensor.

With further reference to FIG. 2, a proximal portion of radiation source assembly 125 comprises a first locator element 150 that is secured to radiation source 130. The manner by which first locator element 150 is secured to radiation lamp 130 is not particularly restricted. This can be achieved by gluing or by mechanical means within the purview of a person skilled in the art.

First locator element 150 comprises a trio of positioning elements 151,152,153. As can be seen, for example, in FIGS. 4-9, positioning elements 151 and 152 have a similar wedge-shaped cross-section whereas positioning element 153 has a substantially rectangular-shaped cross-section. Also disposed on locator element 150 is a pair of apertures 154,155 which receive electrical pin connectors (not shown) from radiation lamp 130. Disposed between apertures 154,155 is a barrier element 156 which serves as a dielectric barrier to obviate or mitigate electrical arcing between the connectors that emanate from apertures 154,155.

As further illustrated, sleeve bolt 140 comprises a trio of notches 141,142,143 which are designed to receive positioning elements 151,152,153, respectively of sleeve bolt 140. Thus, it will be understood that, given the unique shape of positioning element 153 (compared to positioning elements 151,152), locator element 150 can only be secured to sleeve bolt 140 in a unique manner. Put another way, locator element 150 is keyed with respect to sleeve bolt 140.

As further illustrated, sleeve bolt 140 comprises a pair of grooved portions 144 which serve to secure sleeve bolt 140 to housing 115.

When sleeve bolt 140 is secured to housing 115, an O-ring 146 is compressed to provide a substantially fluid tight seal between sleeve bolt 140, housing 115 and protective sleeve 135—see, for example, FIG. 2.

Figure 6:
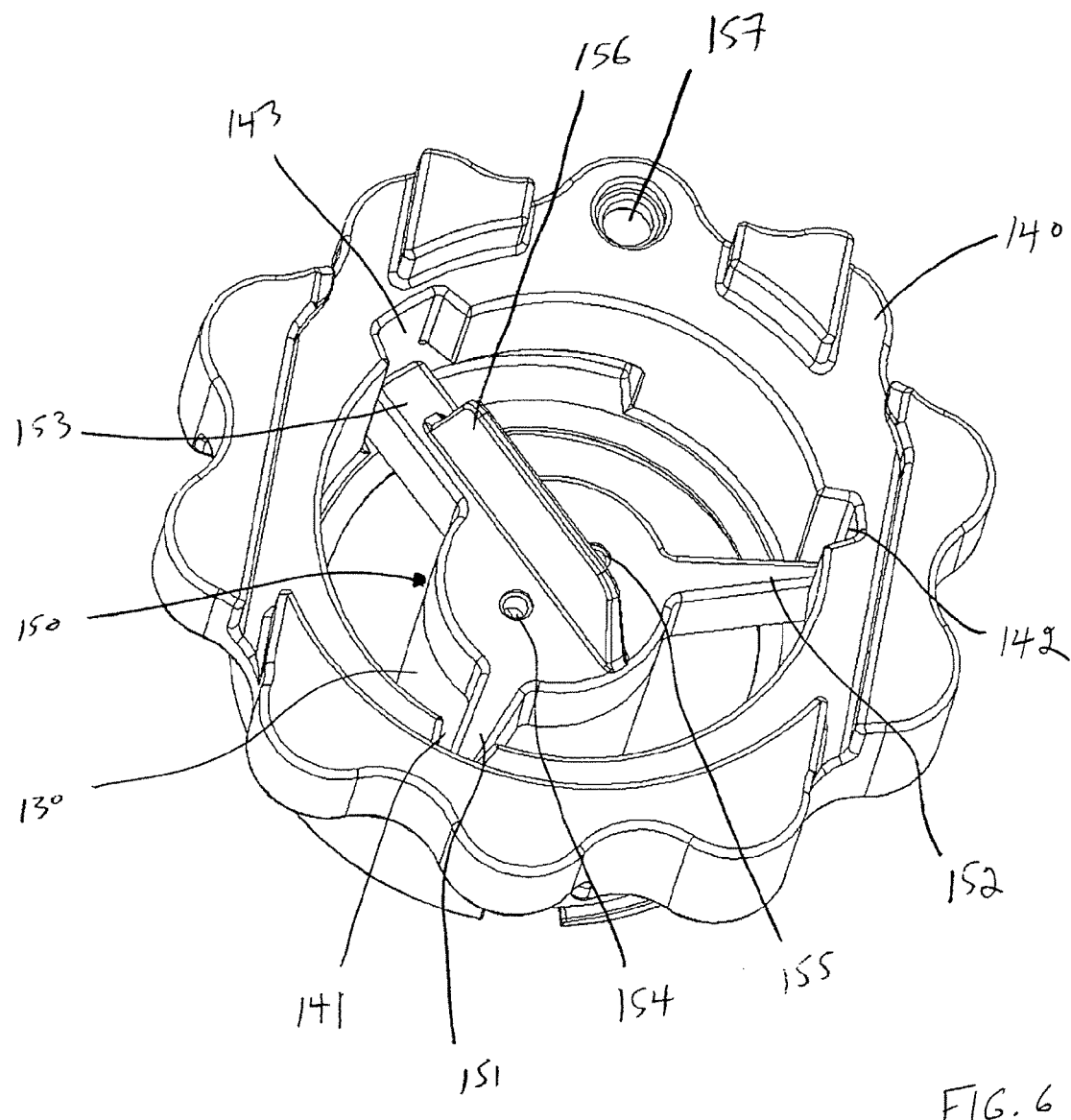
Figure 7:
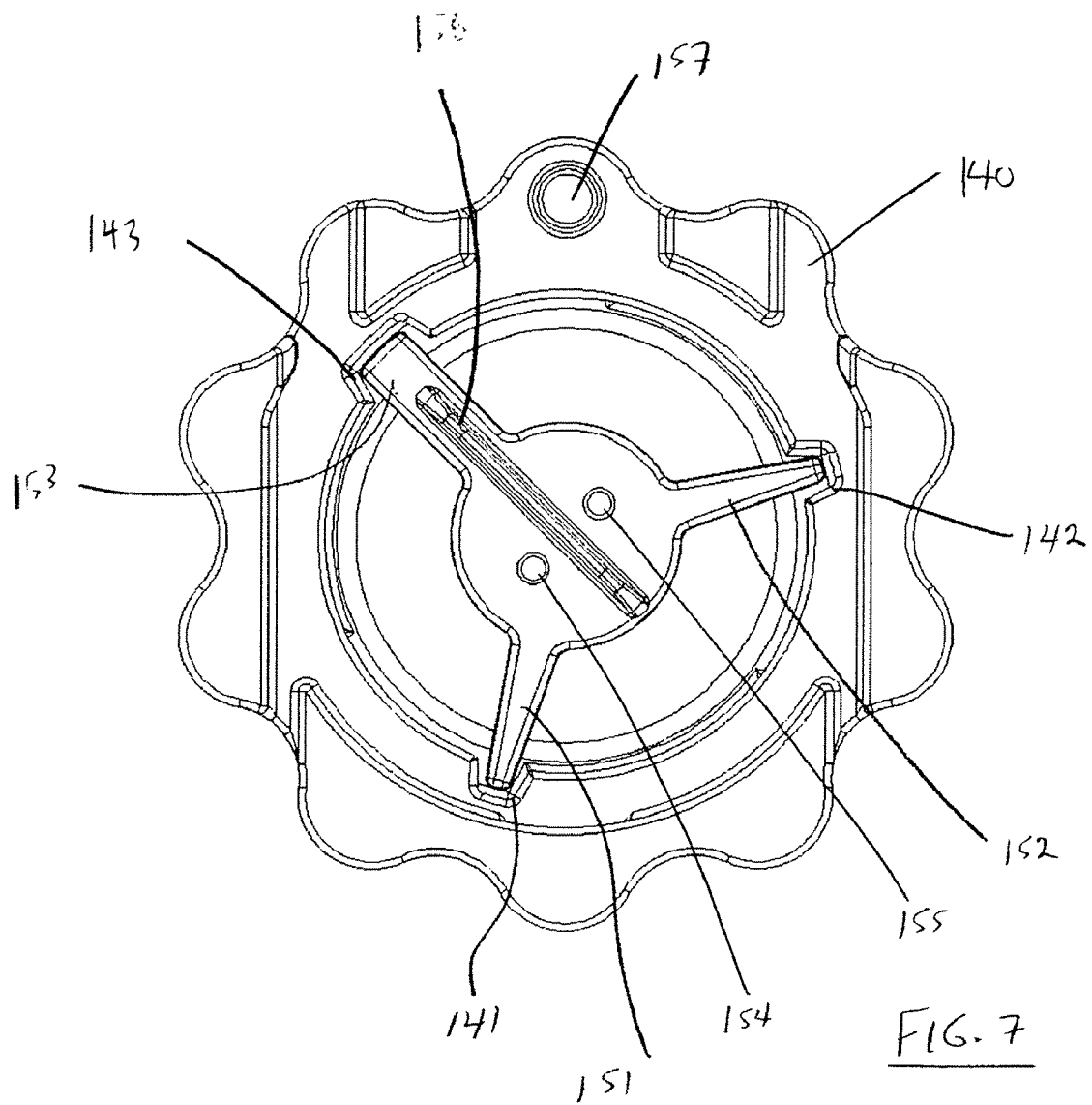
Figure 8:
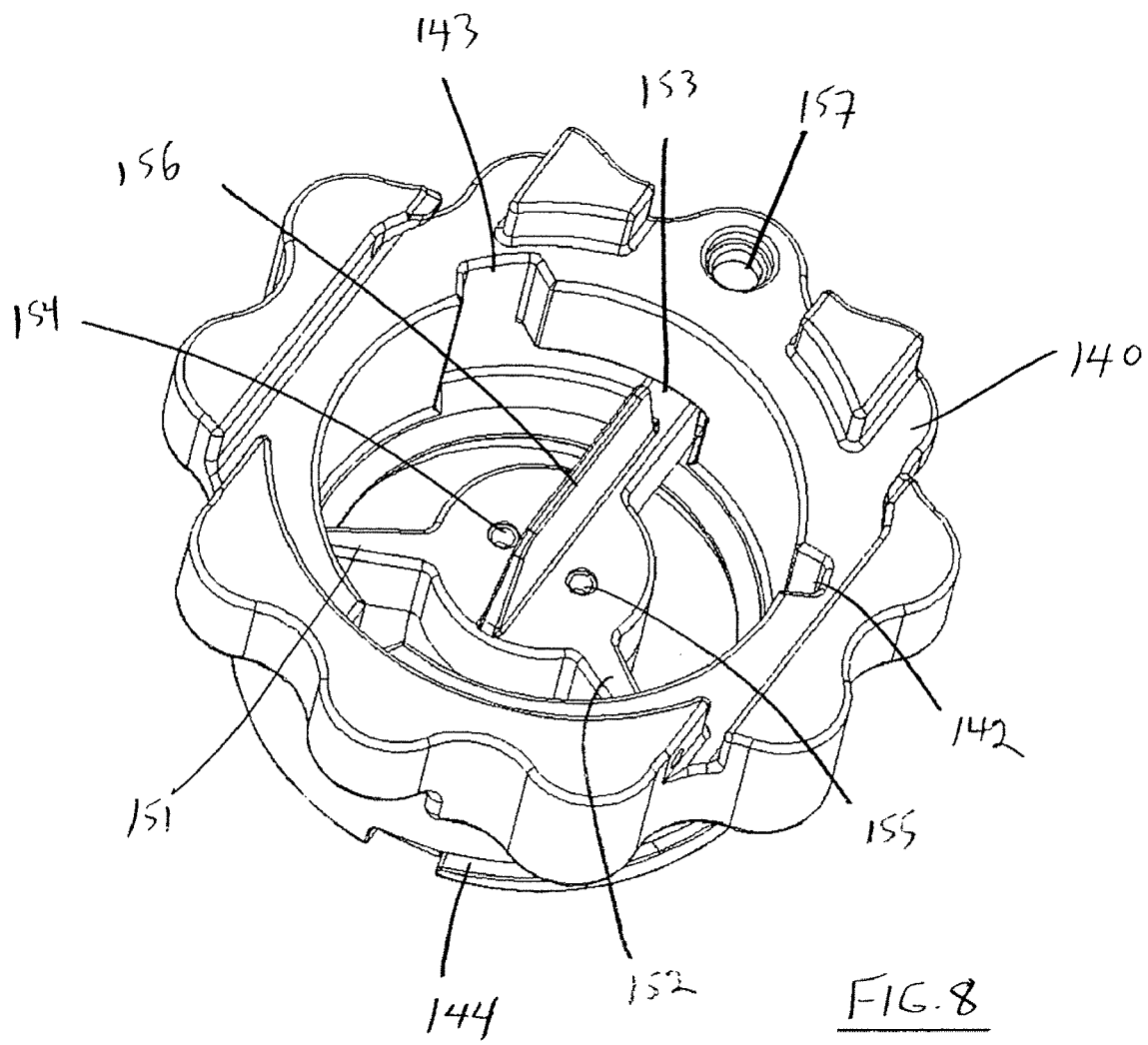
Figure 9:
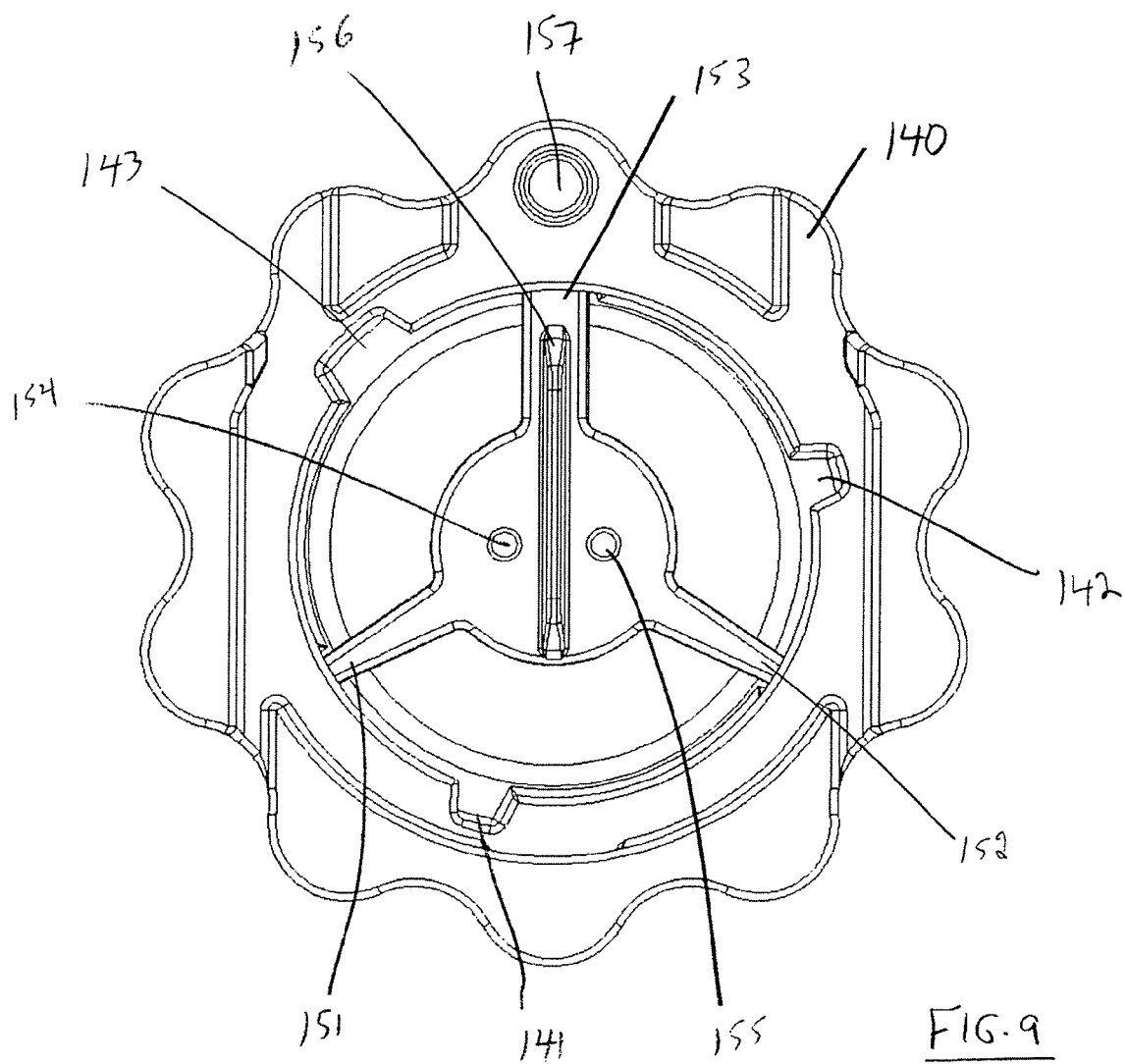

Once it is desired to install radiation lamp 130 in sleeve bolt 140, positioning elements 151,152,153 are aligned with notches 141,142,143, respectively—see FIGS. 6 and 7. Next, radiation lamp 130 is rotated in a clockwise direction so that barrier element 156 is substantially aligned with an aperture 157 for receiving a grounding pin from electrical connection harness 145—see FIGS. 8 and 9.

Figure 4:
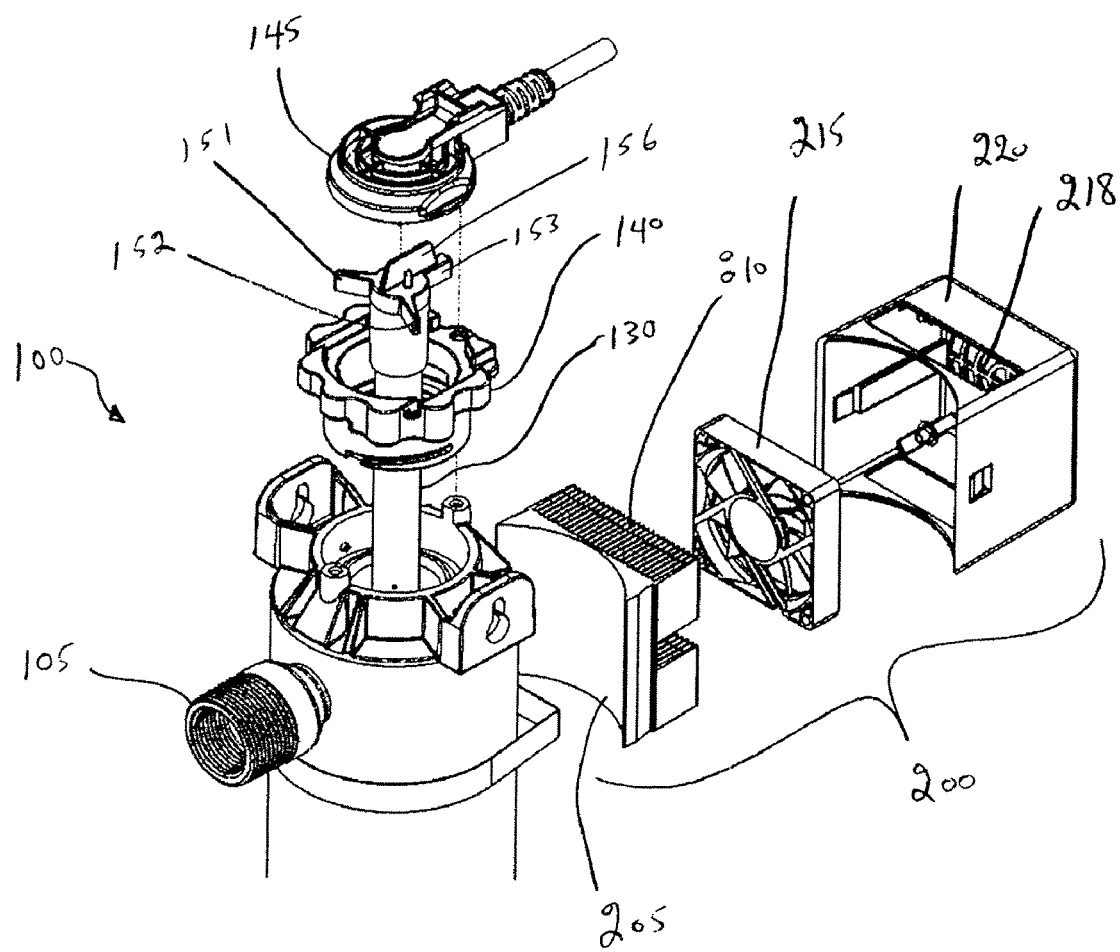
FIG. 4 illustrates the upper portion of fluid treatment system shown in FIG. 1 with the parts disassembled for clarity.
Figure 5:
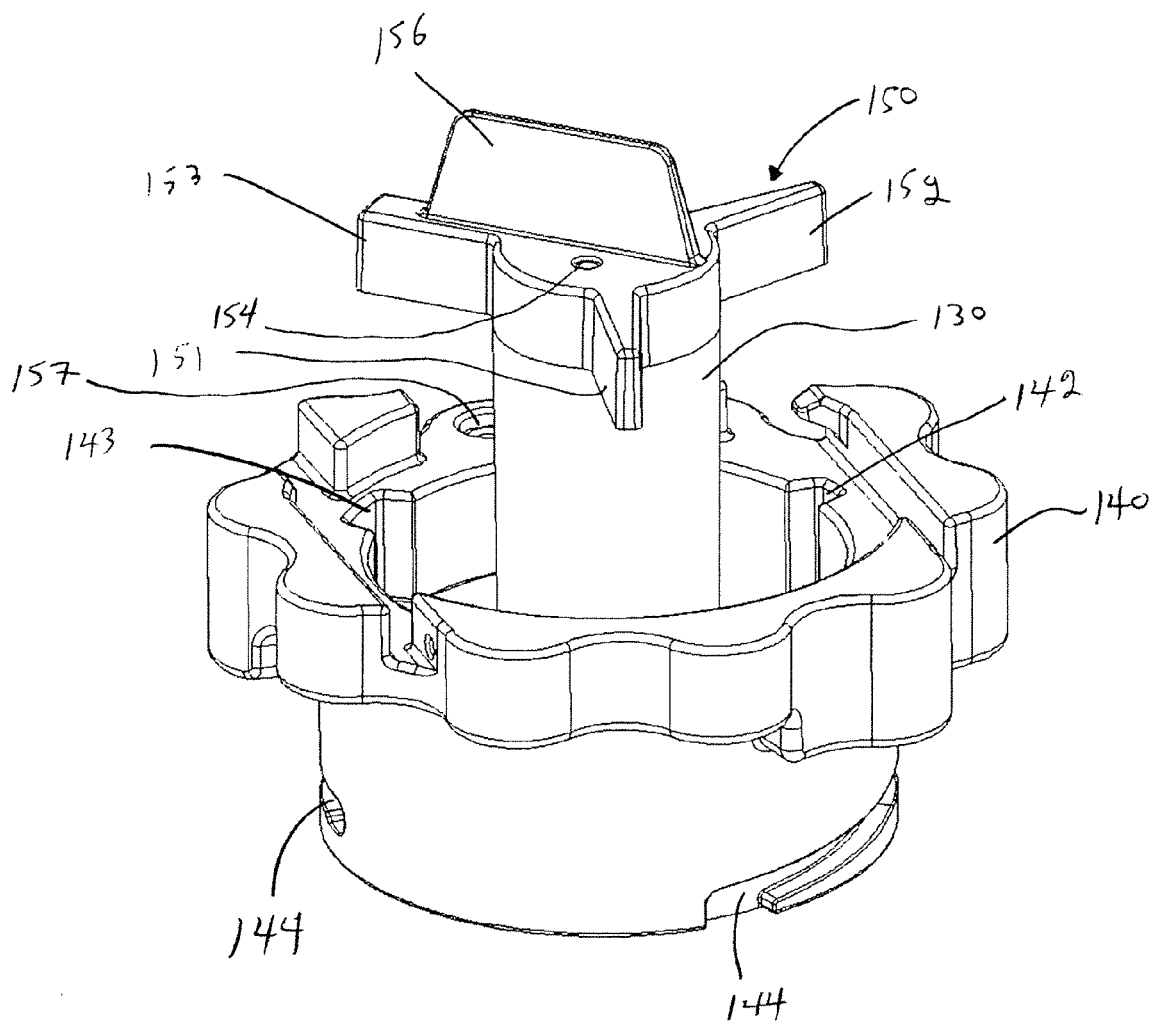
FIGS. 5-9 illustrate the keyed fit between the radiation source and the sleeve bolt in the fluid treatment system illustrated in FIGS. 1-4.

At this point, radiation lamp 130 is properly positioned for connection to electrical connection harness 145 having a ground pin 144 as shown in FIGS. 1 and 4. This connection may be achieved in a conventional manner. One of the advantages of this approach is that the ground pin is connected to aperature 157 prior to electrical connection between electrical connection harness 145 and radiation lamp 130.

Figure 3:
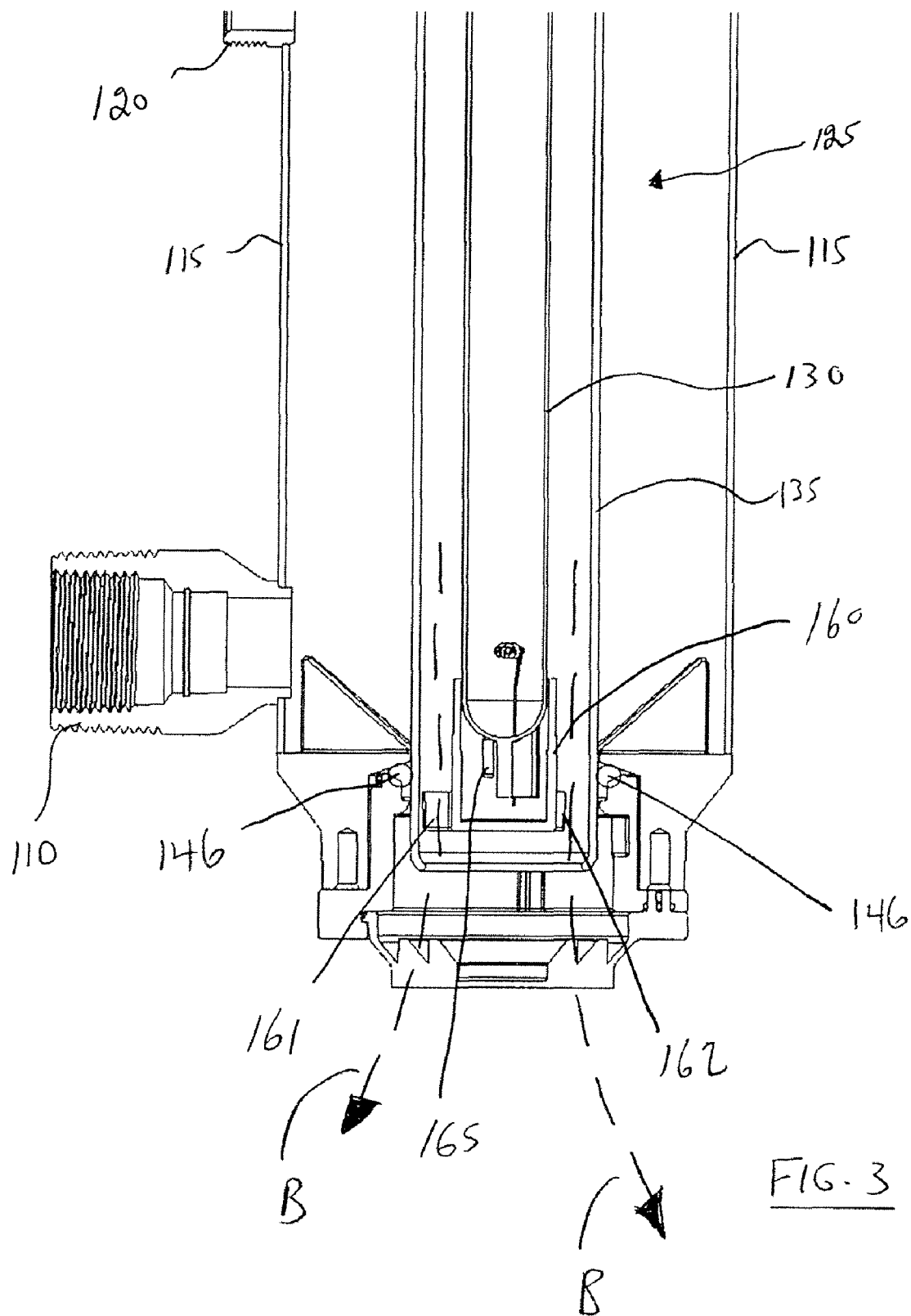
FIG. 3 illustrates an enlarged section view of a lower portion of fluid treatment system illustrated in FIG. 1.

With reference to FIG. 3, the lower portion of fluid treatment system 100 is illustrated. As shown, the distal portion of radiation lamp 130 has secured thereto a second locator element 160 which comprises a trio of positioning elements 161,162,163. Again, second positioning element 160 may be secured to radiation lamp 130 in a conventional manner.

Figure 10:
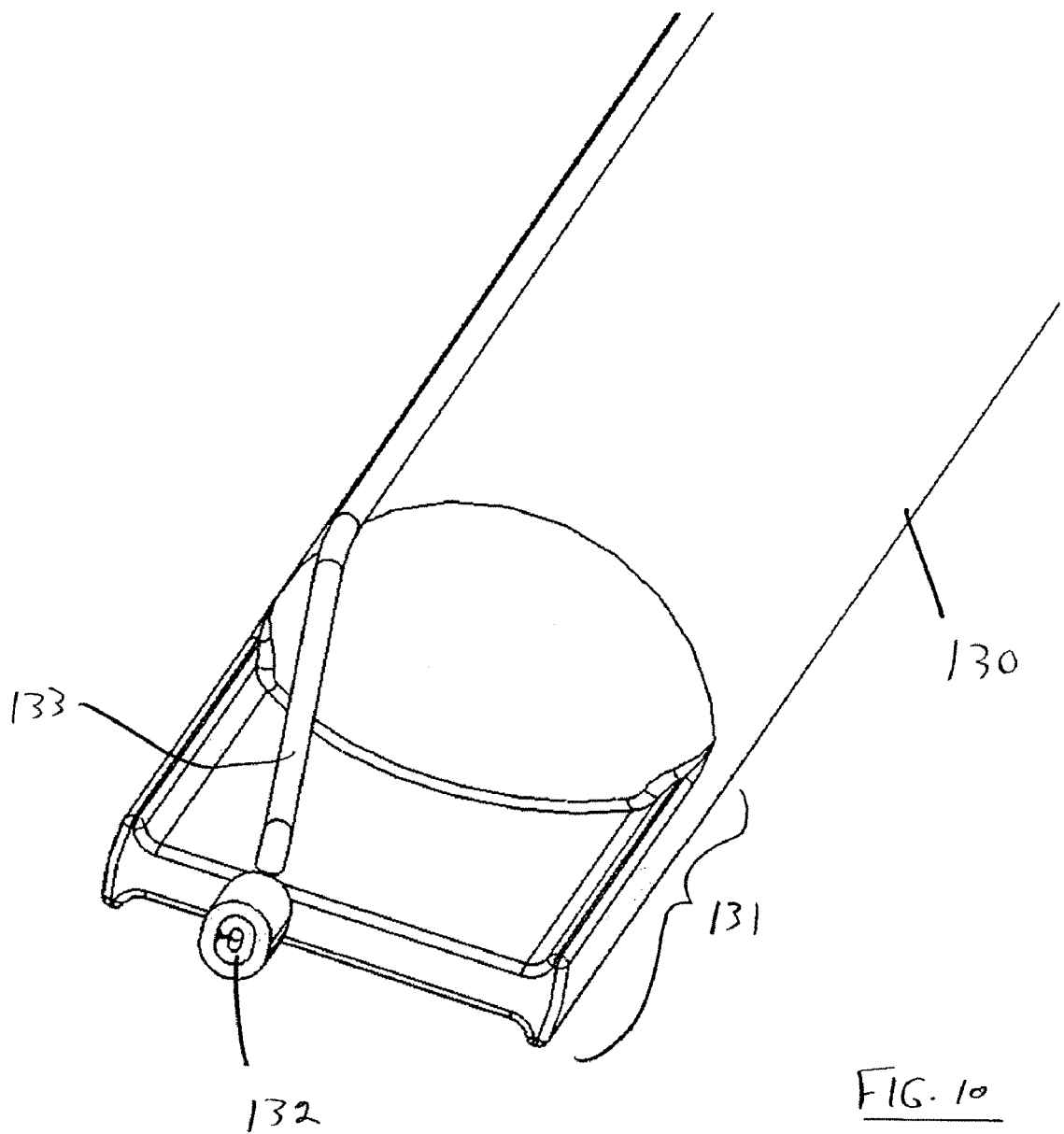
FIG. 10 illustrates an enlarged perspective view of an end of a conventional metal-amalgam (e.g., mercury-amalgam) radiation lamp.
Figure 11:
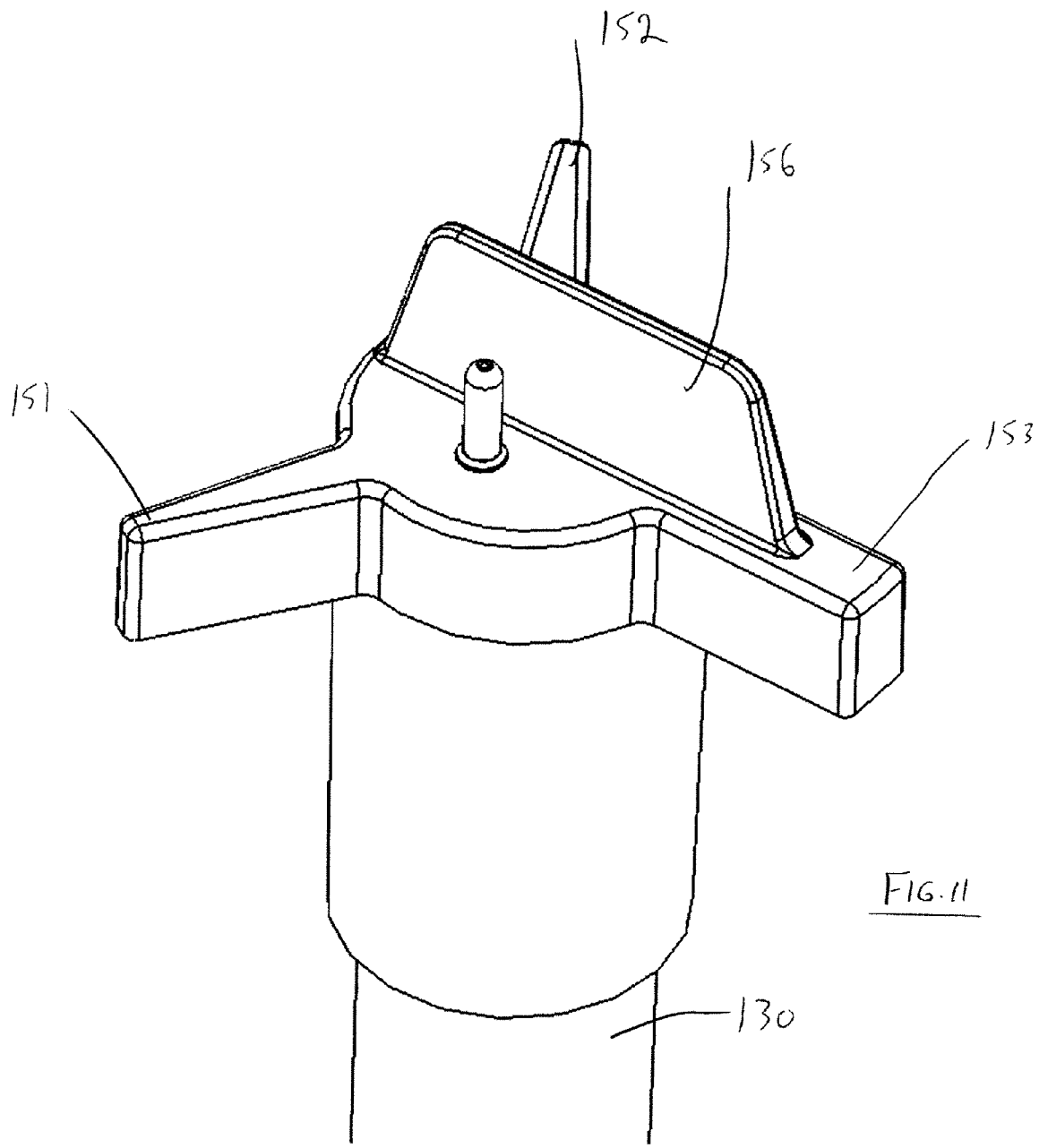
FIG. 11 illustrates an enlarged perspective view of a proximal end of the radiation lamp used in the fluid treatment system illustrated in FIGS. 1-4.

A distal end of lamp 130 is shown in FIG. 10. As illustrated, the end of lamp 130 comprises a pinch portion 131 having an electrical pin 132 emanating there from. An electrical connector 133 is secured to pin 132 and is returned to the proximal region of lamp 134 connection to a pin (not shown) which emanate from one of apertures 154,155 emanating from first locator element 150.

Figure 12:
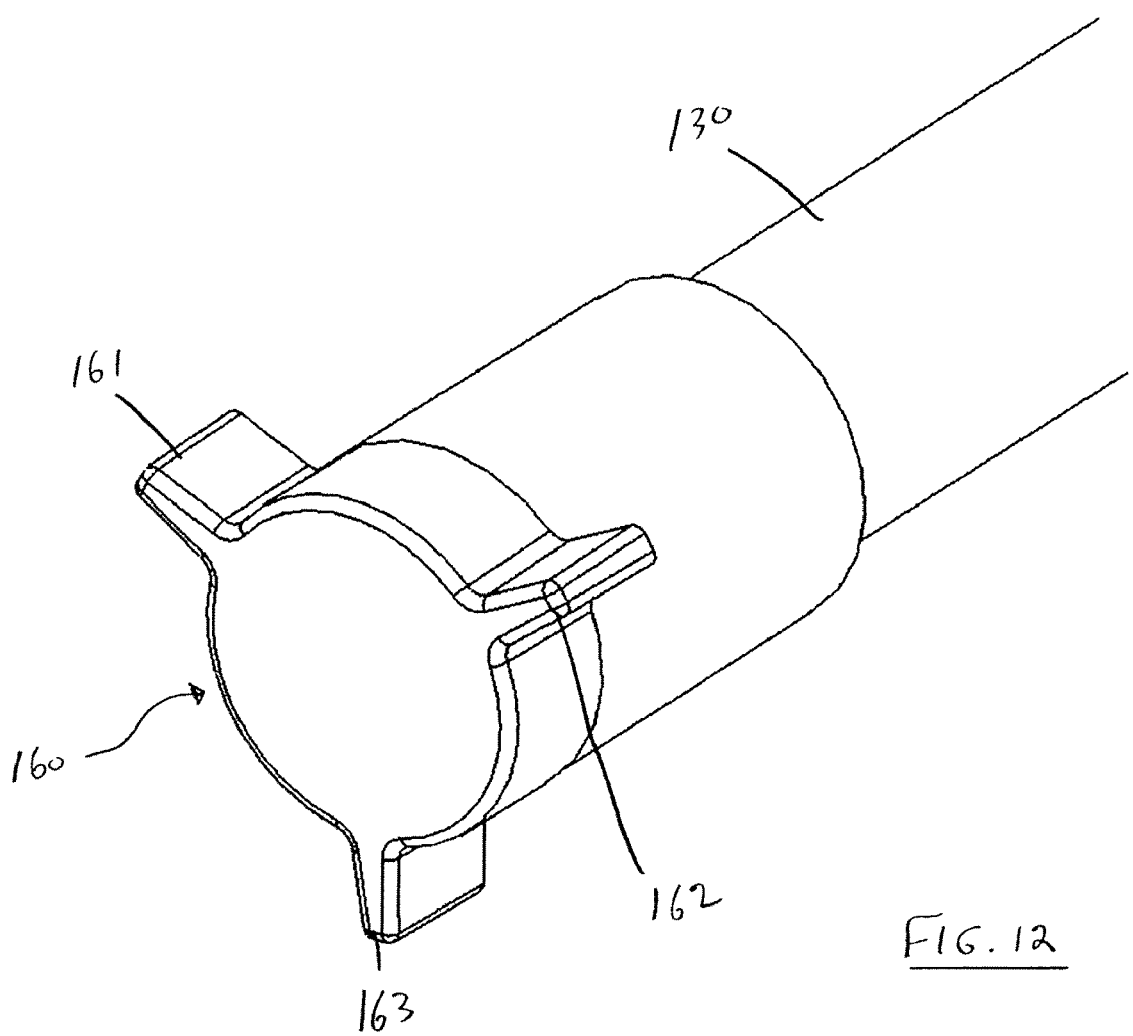
FIGS. 12-18 illustrate an enlarged perspective views of the distal end of the radiation lamp used in the fluid treatment system illustrated in FIGS. 1-4.

In the embodiment illustrated in FIG. 12, second positioning element 160 is effectively functioning as a cap to receive pinch portion 131 (not shown) of the distal end of lamp 130.

With further reference to FIG. 3, a distal portion of radiation lamp 130 comprises a reservoir 165 for receiving a metal-amalgam (preferably mercury-amalgam) composition. As is known in the art, optimum operation of lamp 130 is achieved by controlling operating temperature of the lamp, particularly the temperature of the metal-amalgam composition contained in reservoir 165. Of course, those of skill in the art will recognize that reservoir 165 may be replaced with a so-called metal-amalgam spot disposed in an end region of radiation lamp 130 below the filament.

As further illustrated in the combination of FIGS. 2 and 3, the positioning elements on locator elements 150 and 160 act in combination to align radiation lamp 130 concentrically within protective sleeve 135. Further, since protective sleeve 135 is open at both ends, any heat build-up in the space between radiation lamp 130 and protective sleeve 135 will be removed by the forces of convection typically in the direction of arrow A (FIG. 2) and/or, in some case, in the direction of arrow B (FIG. 3). The provision of an open passage from the annular gap between radiation lamp 130 and protective sleeve 135 facilitates dissipation of heat build up in this space which would otherwise have a deleterious effect on operation of the lamp by virtue of the fact that the metal-amalgam composition in reservoir 165 would be subjected to the influence of the variable heat.

The dissipation of heat may be facilitated further by the provision of a cooling system 200 as shown in FIG. 4. Cooling system 200 comprises a cooling block 205 having a series of cooling fins 210. A fan 215 is positioned adjacent to cooling block 205 and serves to draw heat away from cooling block 205 through a series of openings 218 in a cover 220.

With reference to FIGS. 13-18, there are illustrated various alternate embodiments of second locater element 160, namely locator elements 160a-160f, respectively.

Figure 13:
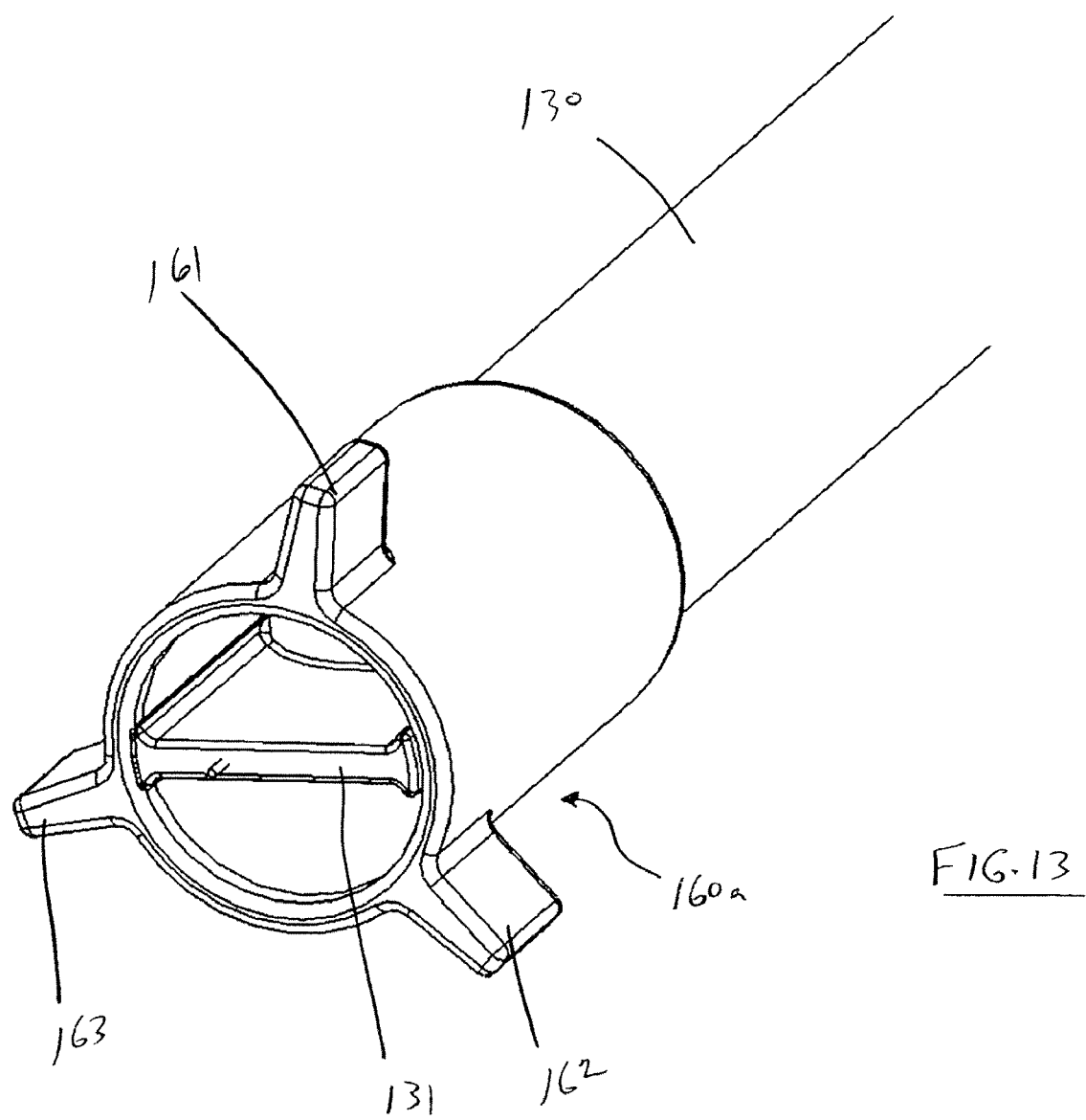

Thus, FIG. 13 illustrates second protector element 160a in which the end portion thereof is open to facilitate dissipation of heat build-up around pinch portion 131 of radiation lamp 130.

Figure 14:
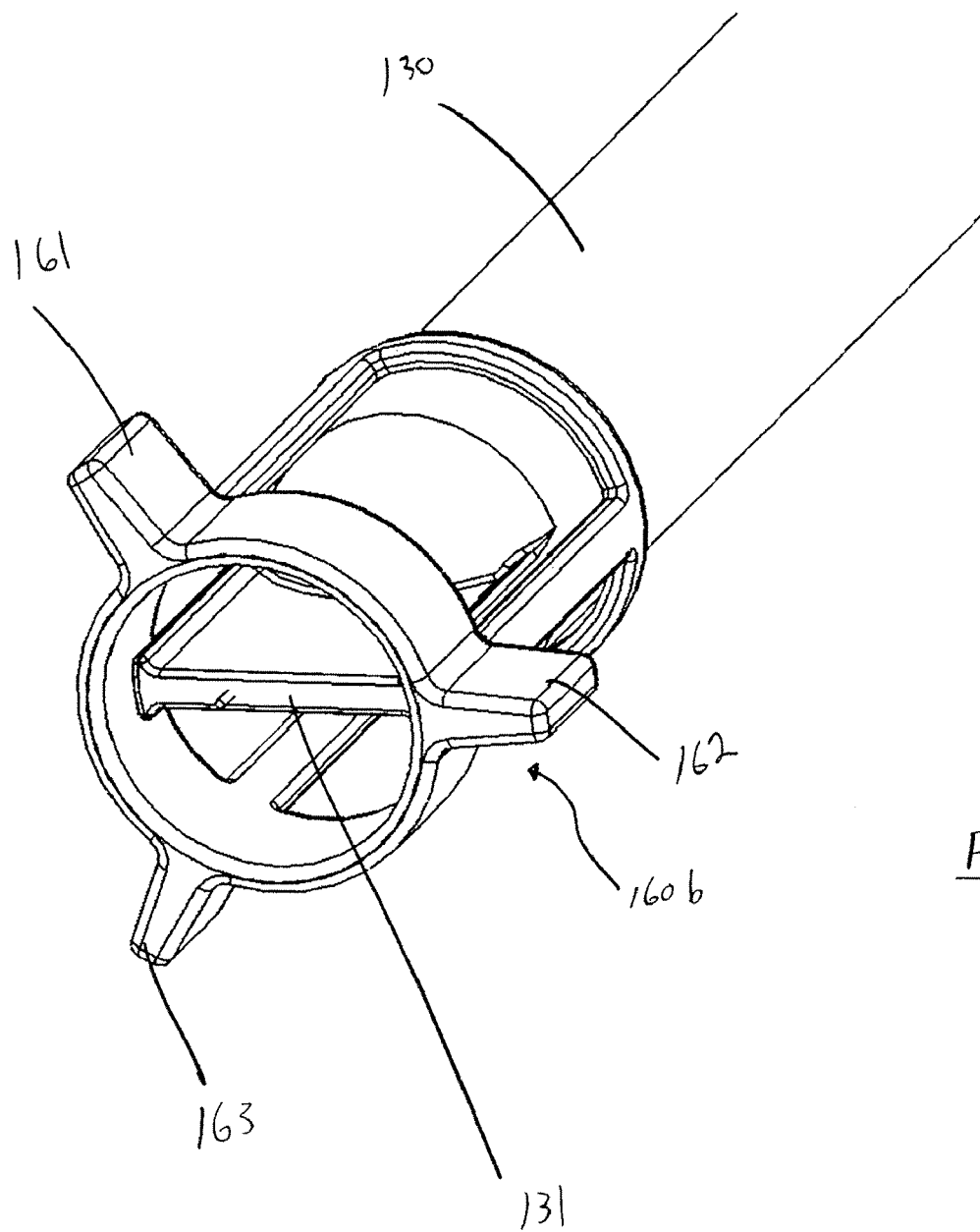

In FIG. 14, second locater element 160b has a portion of the body in thereof cut away to further improve heat dissipation from pinch portion 131 and from the area of radiation lamp 130 in which is disposed the metal-amalgam composition referred to above.

Figure 15:
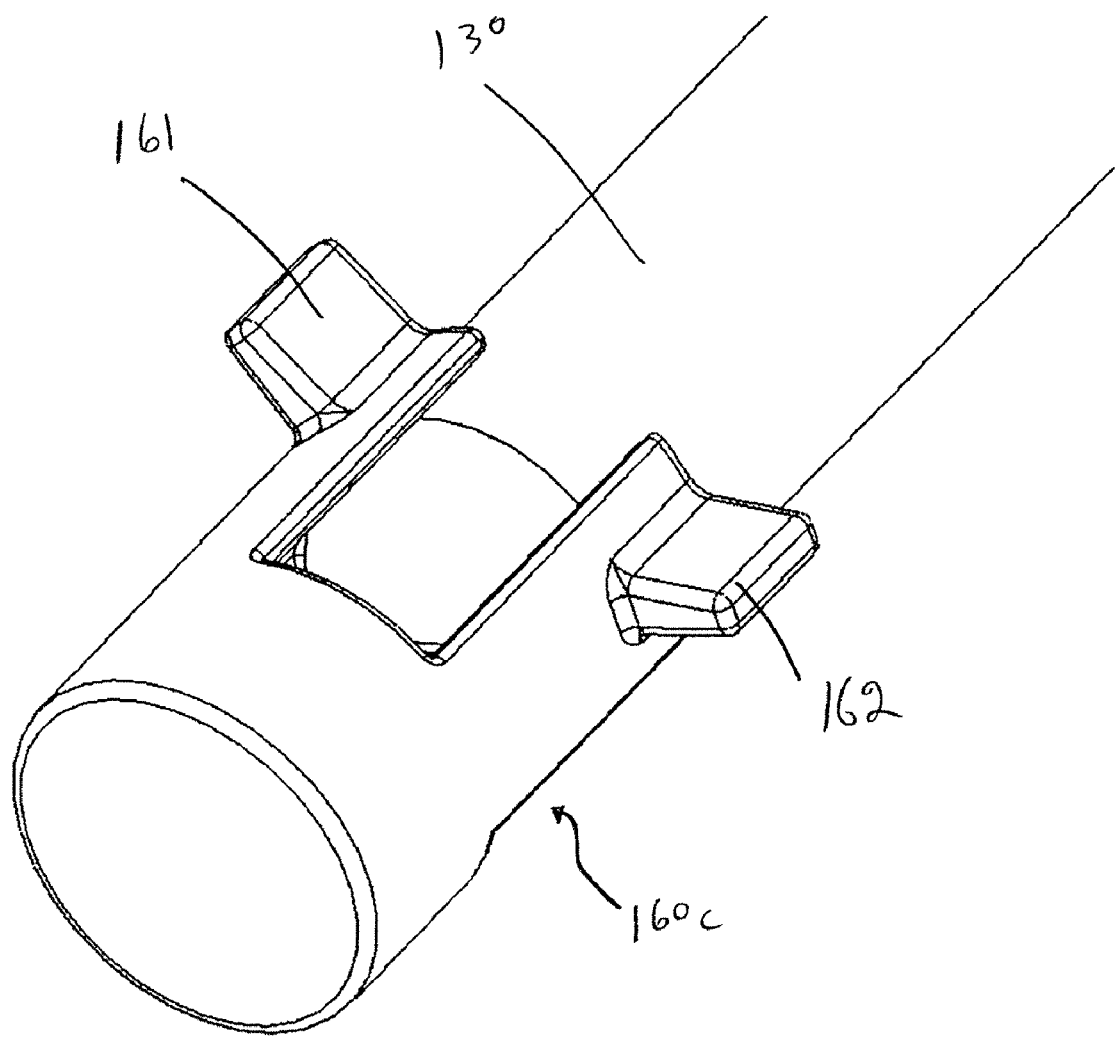

In FIG. 15, second locater element 160c is closed at the end thereof but has a portion of the body thereof cut away to facilitate heat dissipation. As will be further seen, the positioning elements 161,162 on locater element 160c are disposed proximally of the distal end of second locater element 160c.

Figure 16:
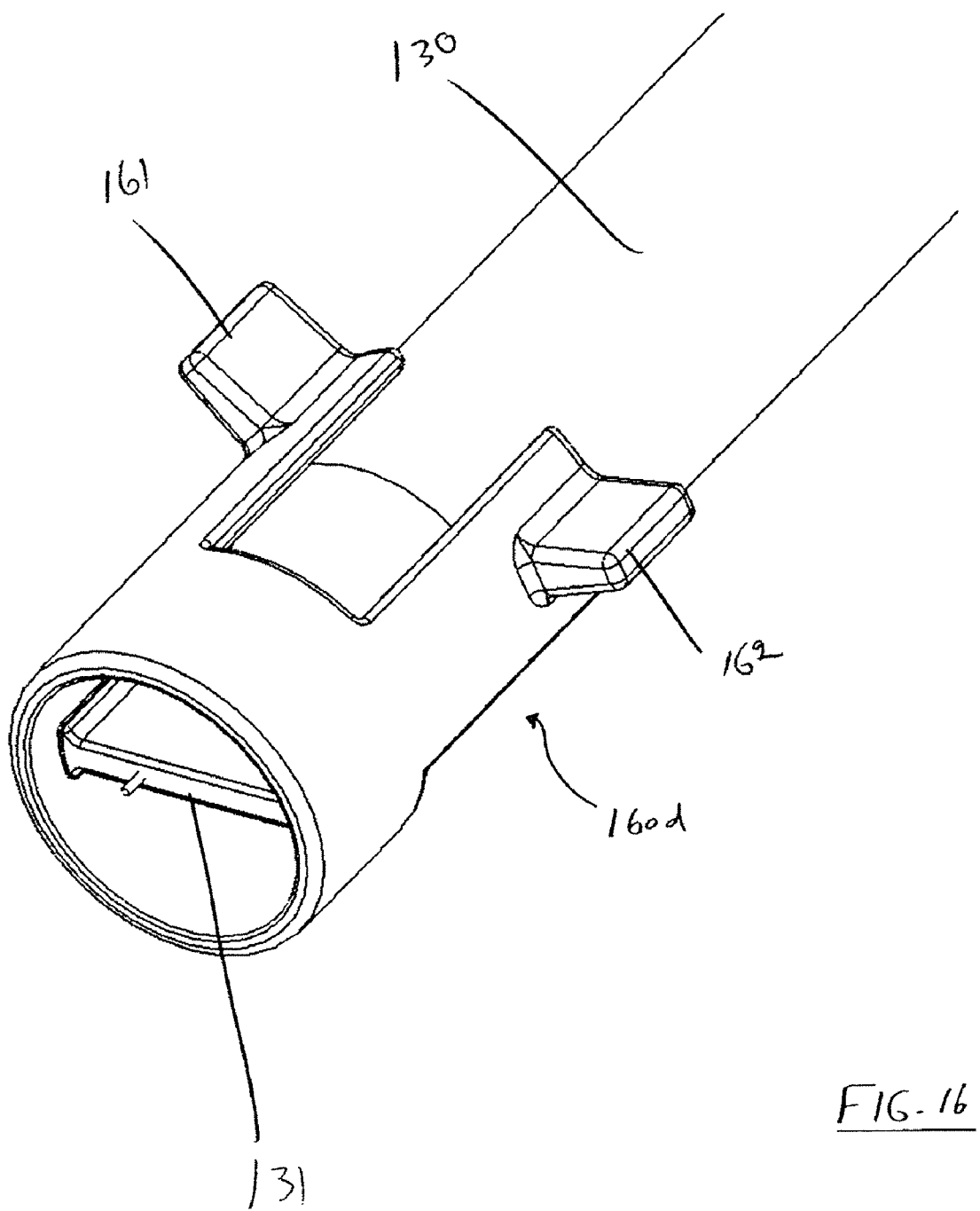

In FIG. 16, second locater element 160d is similar to second locater element 160c illustrated in FIG. 15 with the exception that the end thereof is open as shown in FIG. 13.

Figure 17:
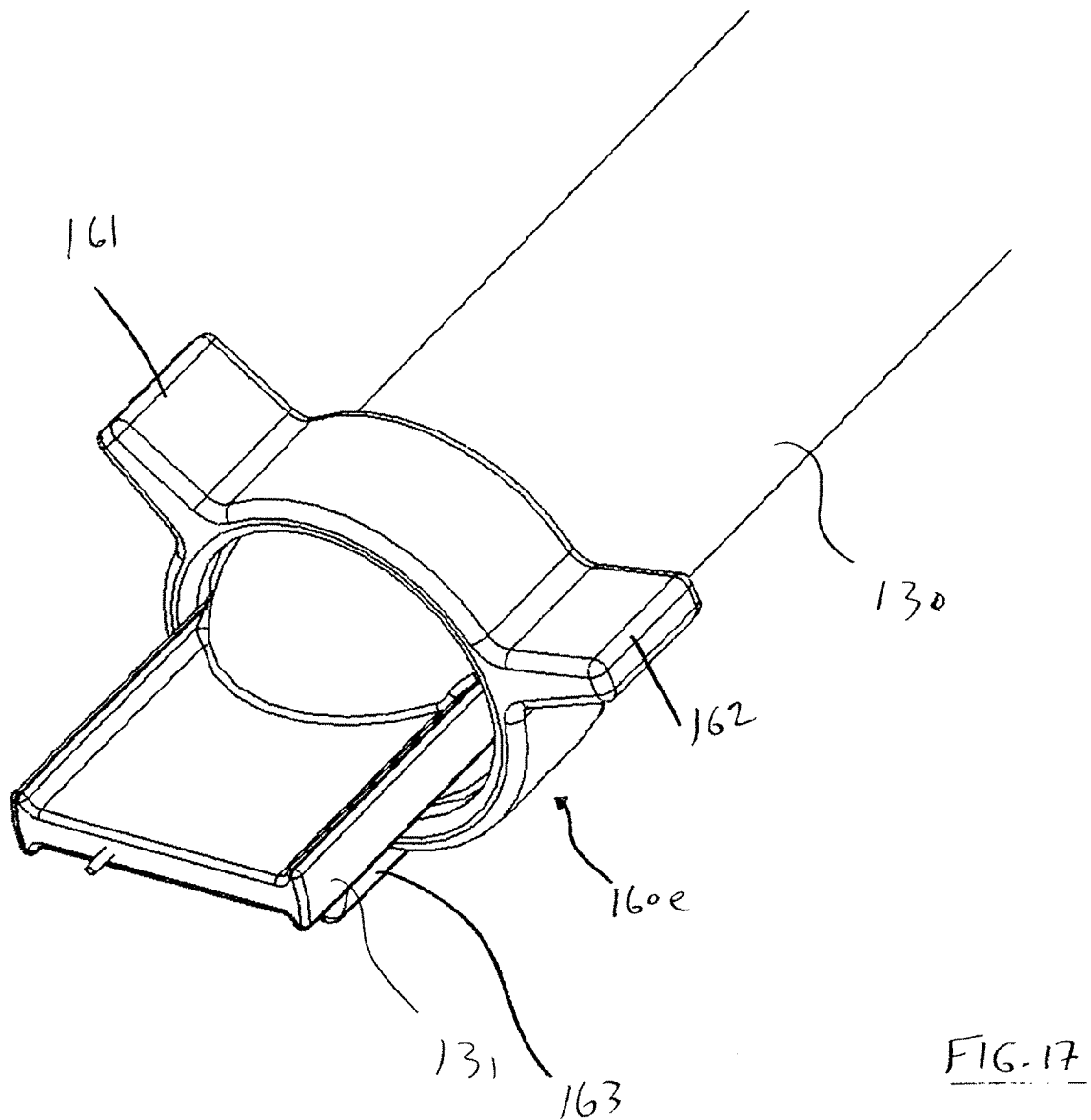

In FIG. 17, second locater element 160e is in the form of a ring which is placed proximally of pinch portion 131 of radiation lamp 130.

Figure 18:
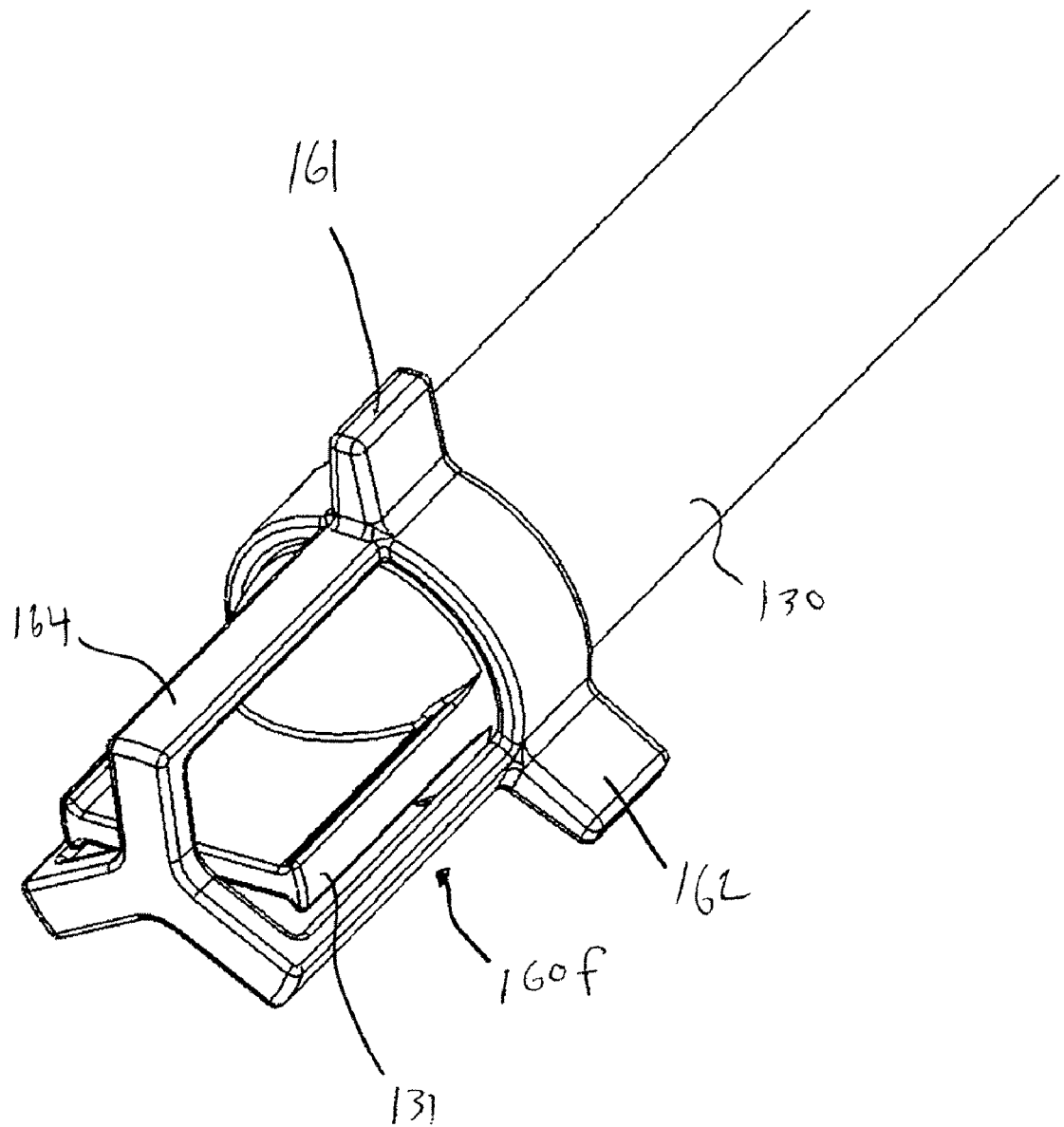
Figure 19:
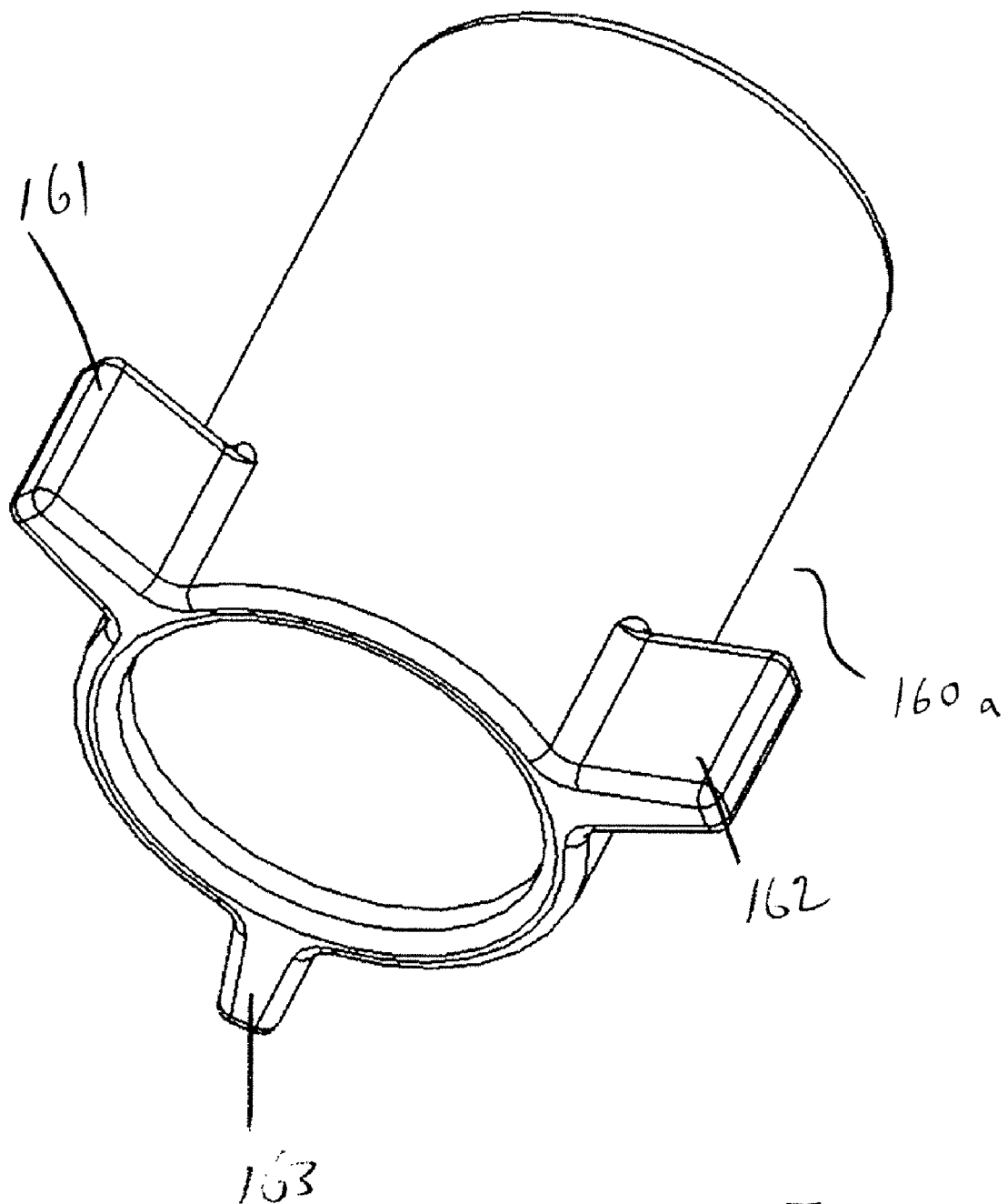
FIGS. 19-23 each illustrate an enlarged perspective view of a preferred locator element that may be used in the distal portion of the radiation lamp used in the fluid treatment system illustrated in FIGS. 1-4.
Figure 20:
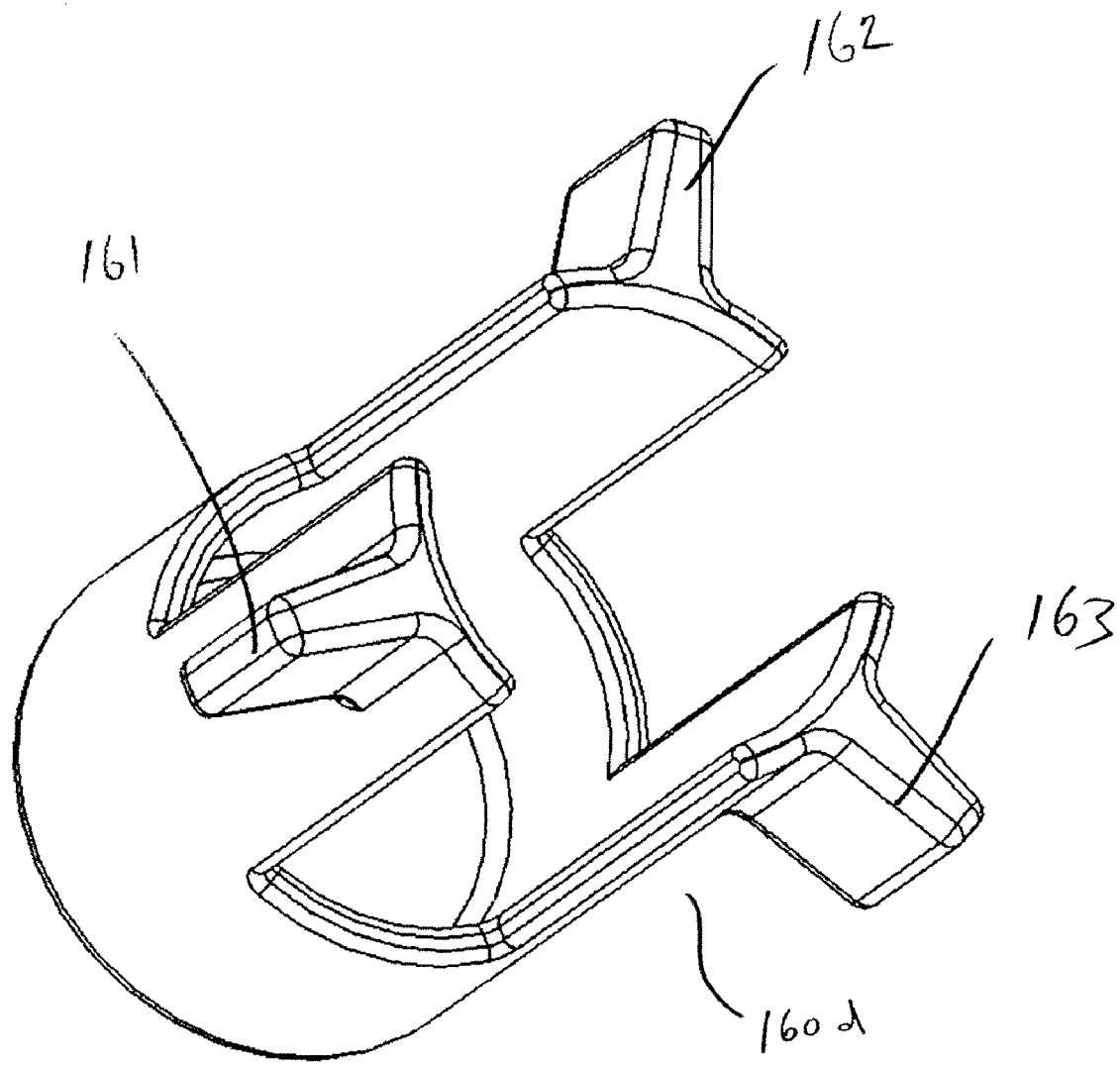
Figure 21:
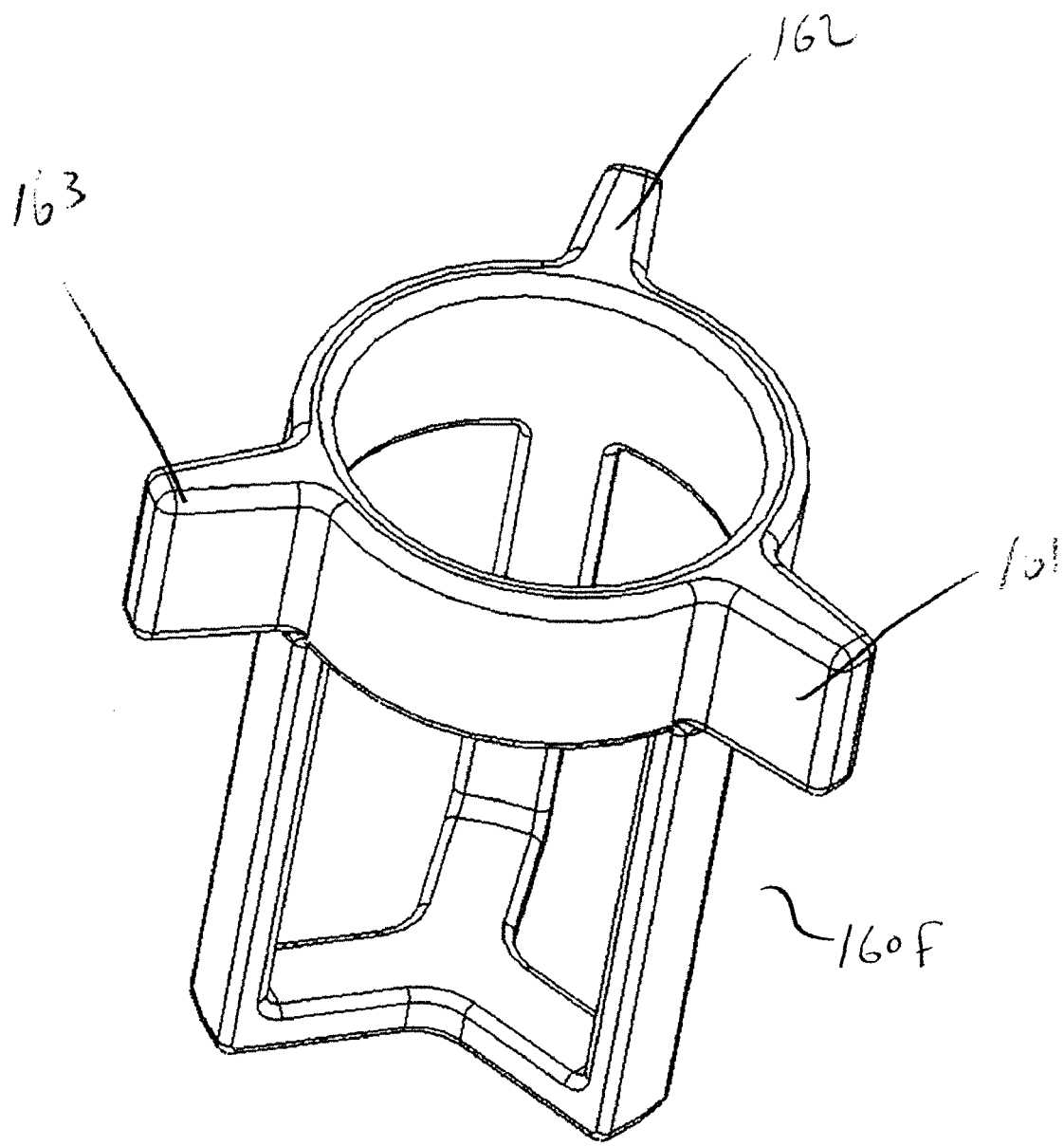
Figure 22:
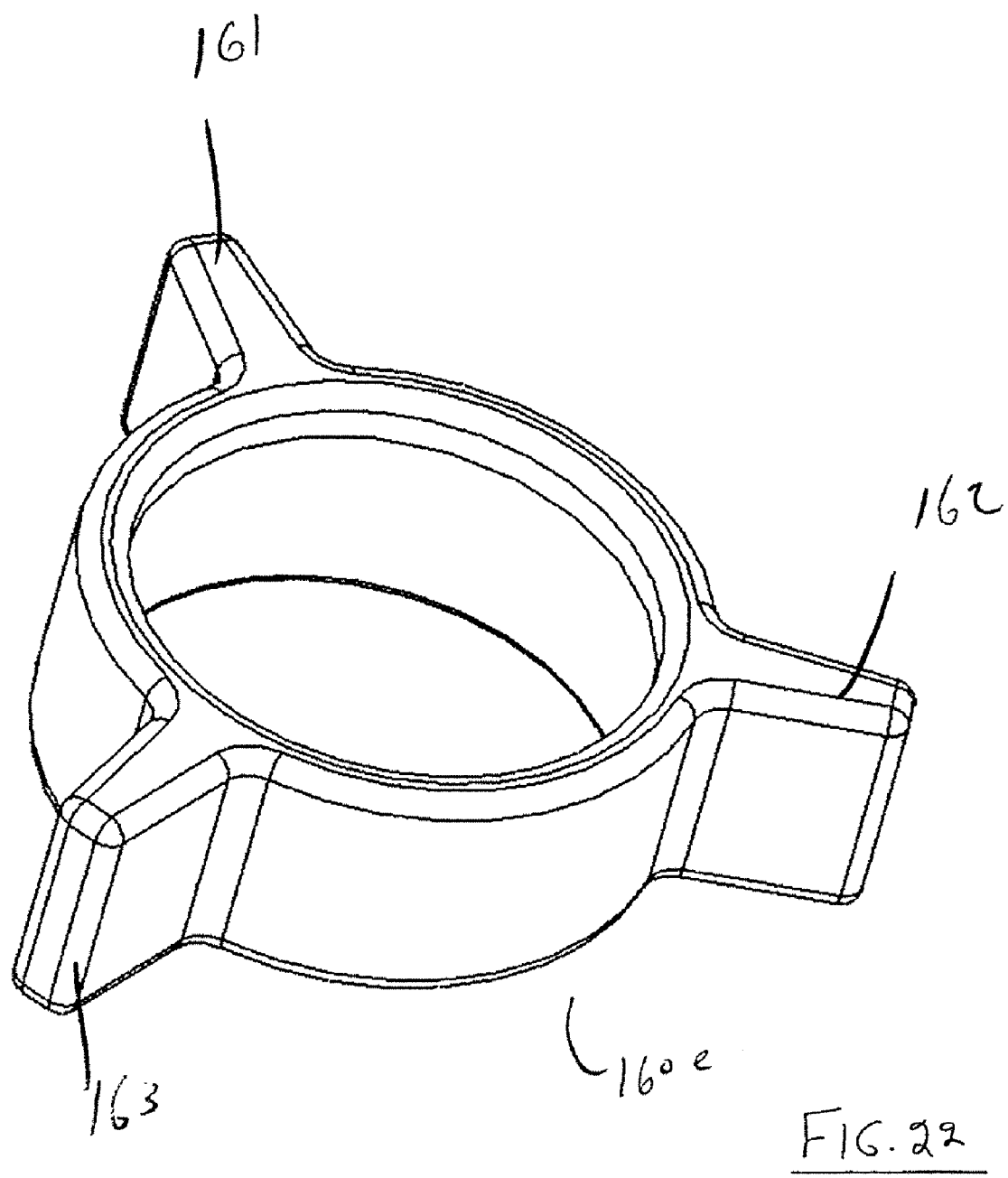

In FIG. 18, second locater element 160f comprises a basket portion 164 which serves to protect pinch portion 131 of radiation lamp 130.

In FIGS. 19-22, there are illustrated enlarged perspective views of various embodiments of the second locater element illustrated in FIGS. 13-18.

Figure 23:
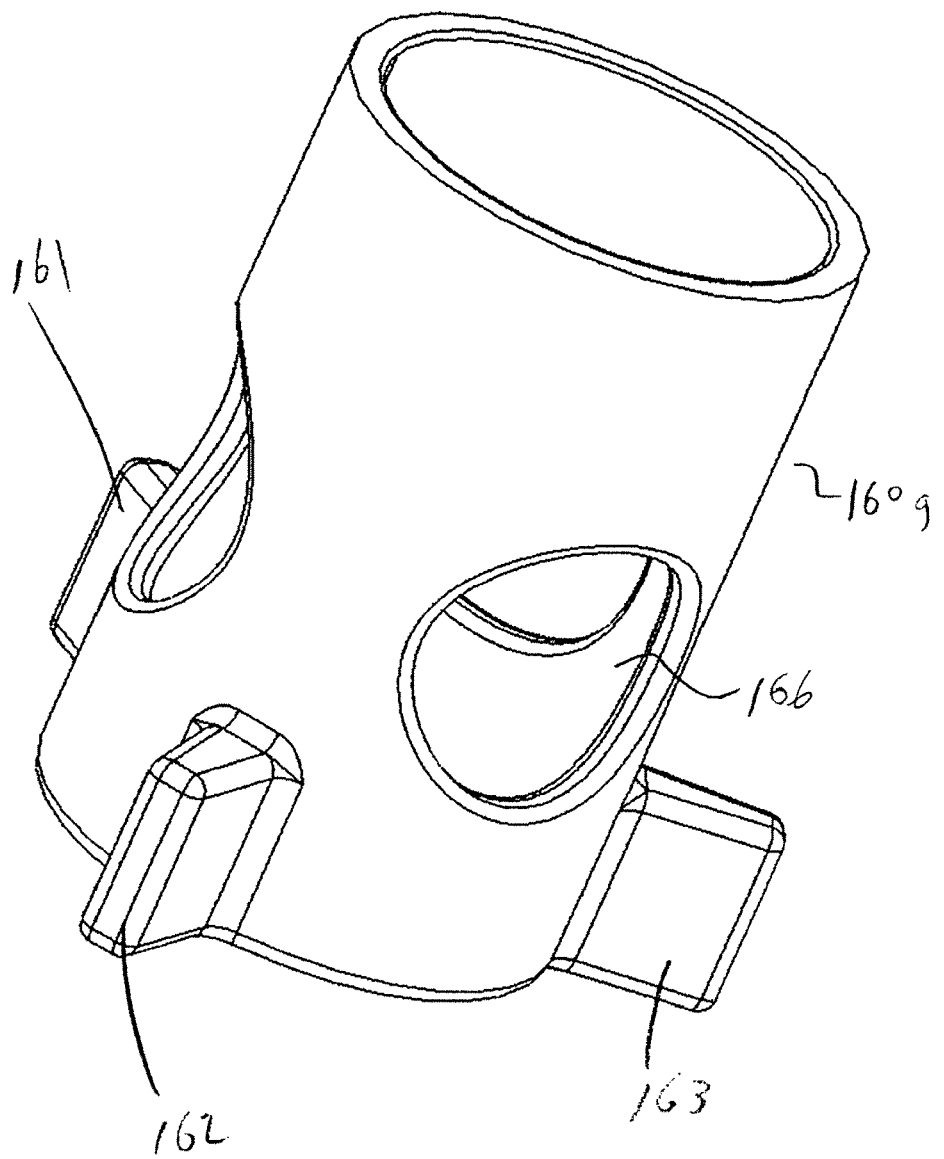

In FIG. 23, there is illustrated an enlarged perspective view of a further alternate embodiment of the second locater element, namely, second locater element 160g which comprises a series of apertures 166 to facilitate dissipation of heat in the area of the radiation lamp (not shown) in which is disposed the metal-amalgam composition described above.

Figure 24:
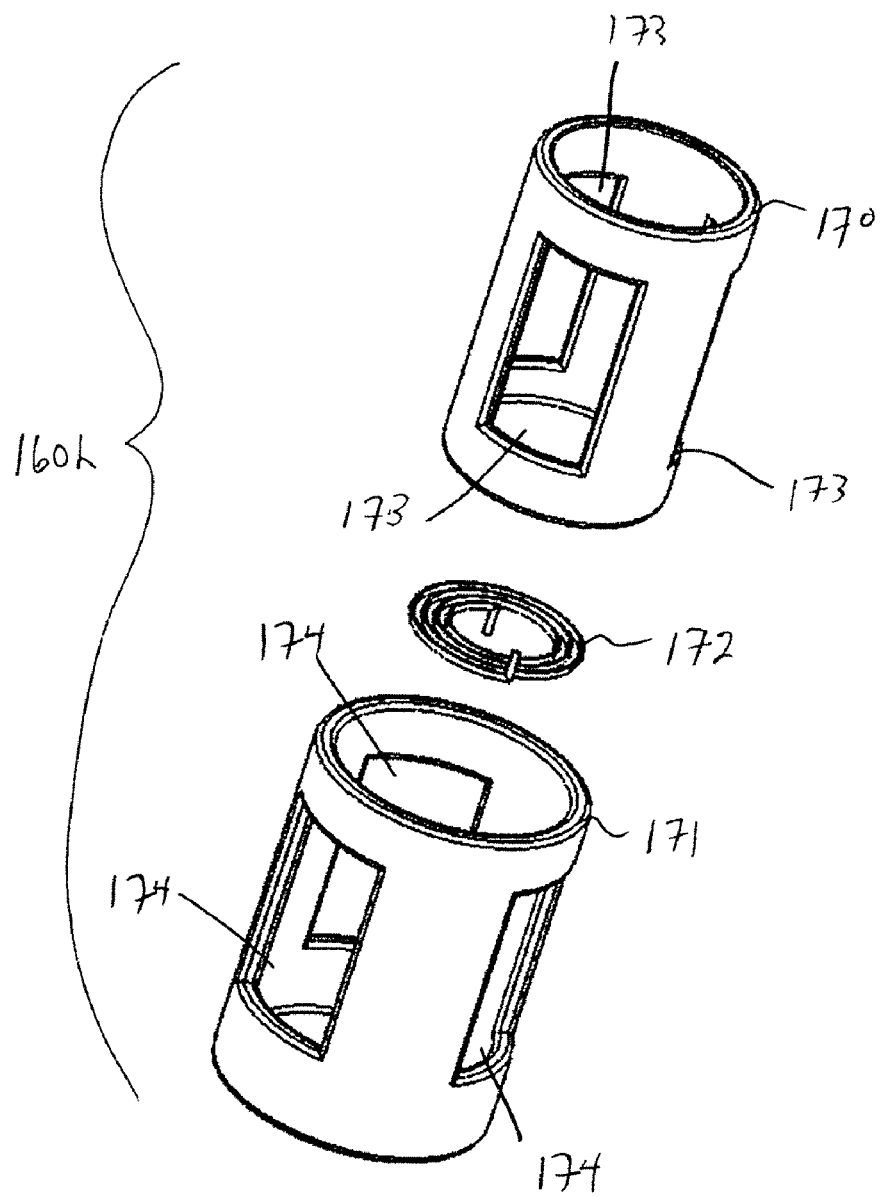
FIG. 24 illustrates a perspective view of a first embodiment of an arrangement for varying the size of the window of the locator element used at the distal portion of the radiation lamp.

With reference to FIG. 24, there is shown yet a further alternate embodiment of the second locater element, namely, second locater element 160h. For clarity, the positioning elements are not shown in FIG. 24. Second positioning element 106h comprises an inner cylindrical element 170 and an outer cylindrical element 171 that are interconnected via a spring element 172. Inner cylindrical element 170 comprises a trio of rectangular shaped windows 173. Outer cylindrical element 171 comprises a trio of rectangular windows 174.

As will be appreciated by those of skill in the art, when windows 173 and 174 are substantially aligned, the so-called venting capacity of second positioning element 160h is maximized. At the other extreme, where there is no overlap between windows 173 and 174, the so-called venting capacity of second positioning element 160h is minimized. Between these two extremes, there are a infinite number of intermediate positions in which there is partial overlap between windows 173 and 174 allowing for tuning or variability in the venting capacity of second positioning element 160h. Such tuning can be achieved by the selection of spring element 172. In some cases, spring element 172 can be made from a heat sensitive material (e.g., nitonal) such that spring element 172 will bias in a manner that increases or decreases the venting capacity of second locating element 160h depending on the temperature of the environment surrounding spring element 172.

With reference to FIGS. 25-28, there is shown a further alternate embodiment of the second locater element, namely, second locater element 160i. Again, the positioning elements are not shown for clarity. For ease of understanding, an asterisk (*) has been used as a suffix to denote elements in FIG. 25 which correspond substantively to those appearing in FIG. 24.

Figure 25:
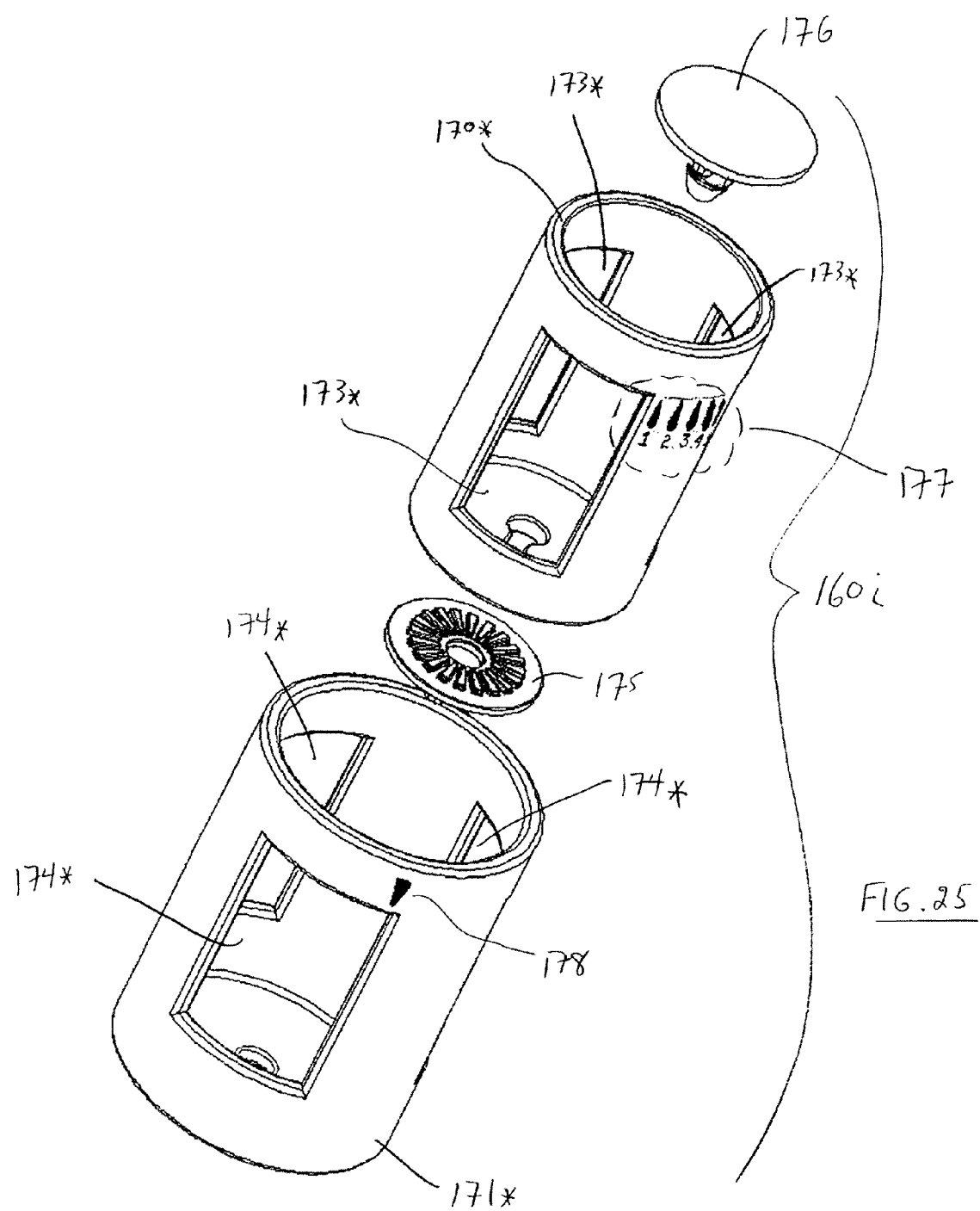
Figure 26:
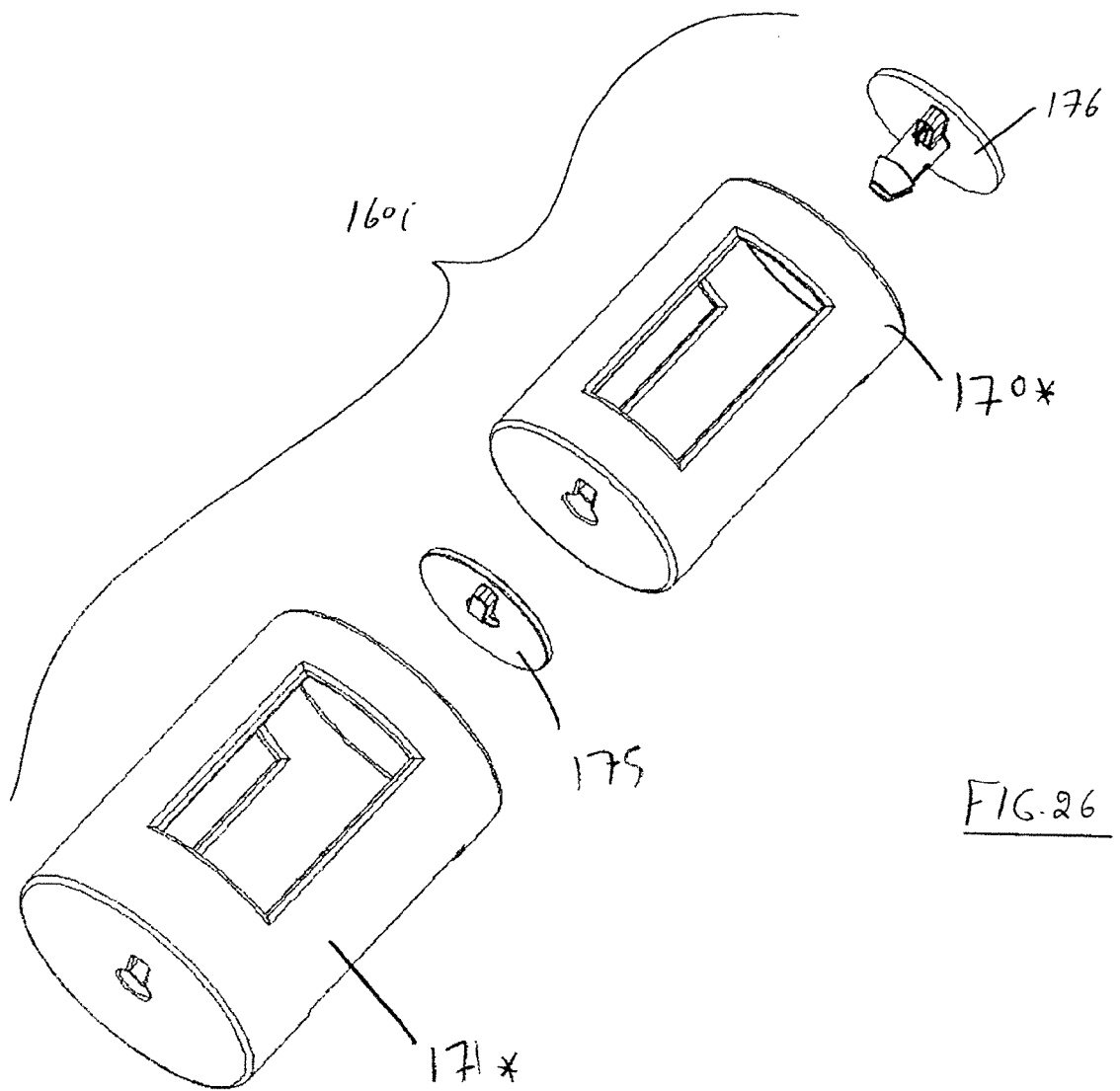
Figure 27:
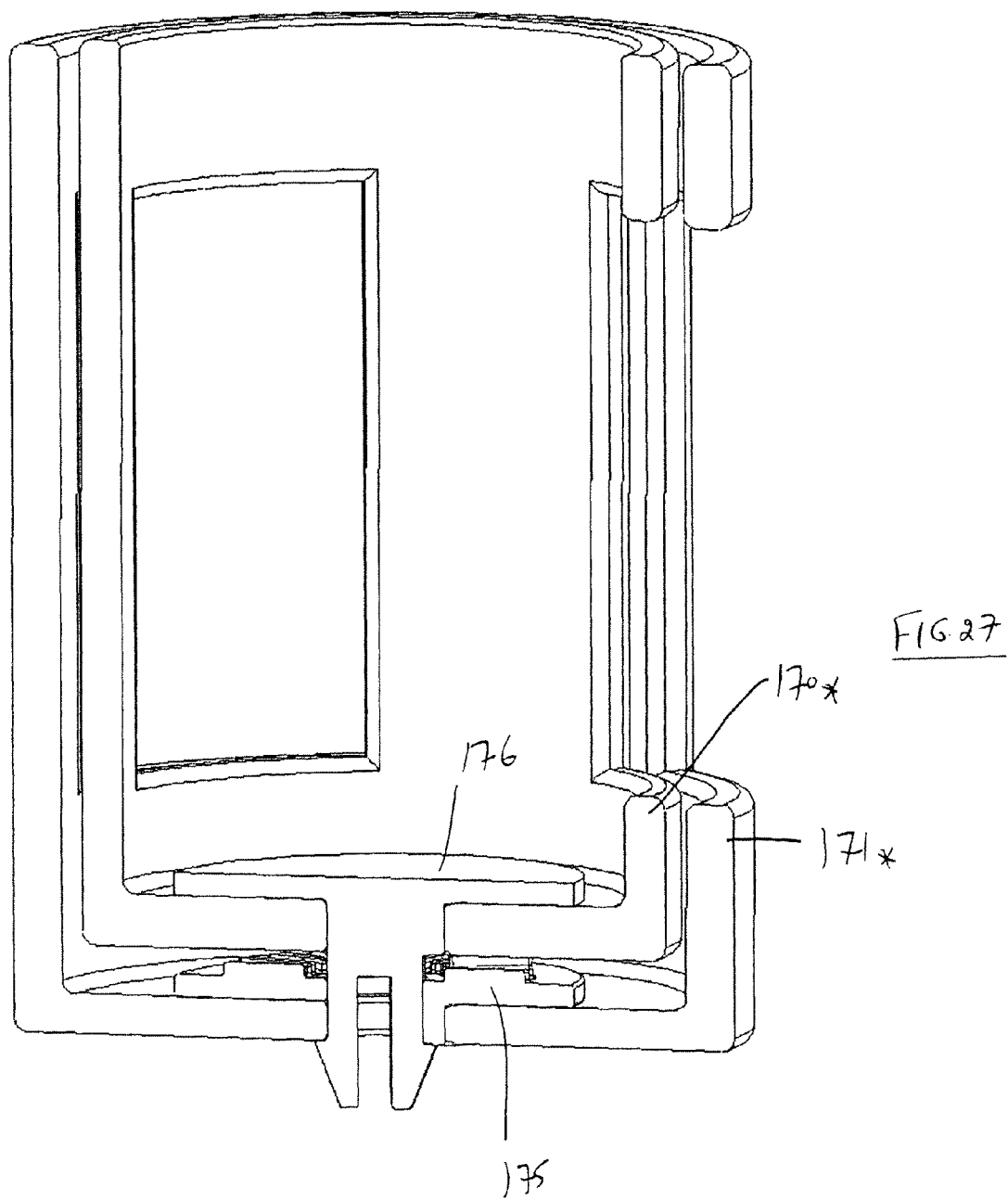

The principal difference in FIG. 25 is the use of a cogwheel 175 in FIG. 25 (in place of spring element 172 in FIG. 24) in combination with a lock element 176 to achieve relative movement between cylindrical element 170* and cylindrical element 171*.

Further, a series of indicia 177 is provided on the cylindrical element 170* and a single marker 178 is provided on cylindrical element 171*. The adjustment of the venting capacity of second positioning element 160i is achieved by positioning the appropriate indicium 177 in alignment with marker 178. This can be done, for example, knowing the length of the radiation lamp, the position of the metal-containing amalgam composition with respect to windows 173* and 174*, the diameter of protective sleeve 135, the ambient air temperature, the type of radiation lamp 130 and other factors. The venting capacity of second locater element 160i can be adjusted during assembly of the fluid treatment system, replacement of the radiation lamp, etc.

With reference to FIGS. 29-31, there are illustrated various alternate embodiments to cylindrical element 170, 171, 170* and 171* referred to above. The principal change is to the shape of the windows in the cylindrical elements.

In FIG. 29, the V-shaped window of each cylindrical element provides for non-linear tuning of the venting capacity of the second locater element. By this it is meant that the degree of the overlap between the windows of the cylindrical elements various non-linearly with relative movement of the cylindrical elements. FIG. 31 illustrates circular windows in which a similar non-linear relationship can be seen.

In FIG. 30, the relationship is linear as was the case with the embodiments discussed above with reference to FIGS. 24-28.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. For example, it is possible to modify the illustrated embodiments to utilize a fan or the like (with or without cooling system 200) to assist the natural convection of heat build-up in the gap between radiation lamp 130 and protective sleeve 135. Further, it is possible to substitute metal-amalgam with metal only (e.g., pure mercury). Still further, in certain cases, it is possible to omit second locator element 160 from radiation source assembly 125. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A fluid treatment system comprising:
   a housing for receiving a flow of fluid, the housing comprising a fluid inlet, a fluid outlet, a closed fluid treatment zone disposed between the fluid inlet and the fluid outlet, and at least one elongate radiation source assembly having a longitudinal axis disposed in the fluid treatment zone substantially parallel to a direction of the flow of fluid through the housing; and
   wherein the radiation source assembly comprises an elongate radiation source disposed in a protective sleeve to define a substantially annular passageway, the protective sleeve having opposed open ends configured to permit heat to exit the passageway and the housing through at least one of the opposed open ends of the sleeve, both ends of the radiation source being disposed within the housing.

2. The fluid treatment system defined in claim 1, wherein the radiation source comprises an electrical connection only at one end thereof.

3. The fluid treatment system defined in claim 1, wherein a proximal end of the radiation source comprises a first locator portion configured to position a proximal end of the radiation source to be substantially concentric with respect to a proximal end of the protective sleeve.

4. The fluid treatment system defined in claim 3, wherein the first locator portion comprises a pair of apertures configured to receive a pair electrical contact elements of the radiation source.

5. The fluid treatment system defined in claim 4, wherein the first locator portion further comprises a barrier portion disposed between the pair of apertures and configured to reduce arcing between the pair of electrical contact elements of the radiation source.

6. The fluid treatment system defined in claim 3, wherein the first locator portion comprises a plurality of first finger portions to position a proximal end of the radiation source to be substantially concentric with respect to a proximal end of the protective sleeve.

7. The fluid treatment system defined in claim 6, further comprising a sleeve bolt for receiving at least one of the plurality of first finger portions in locked position, the sleeve bolt configured to be removably connected to the housing.

8. The fluid treatment system defined in claim 7, wherein the sleeve bolt is configured to be connection to an electrical connection harness only when at least one of the plurality of first finger portions is in a locked position in the sleeve bolt.

9. The fluid treatment system defined in claim 1, wherein the radiation source comprises a metal amalgam composition on an interior surface thereof.

10. The fluid treatment system defined in claim 9, wherein the metal amalgam composition comprises a mercury amalgam composition.

11. The fluid treatment system defined in claim 9, wherein the metal amalgam composition is disposed near a proximal end of the radiation source.

12. The fluid treatment system defined in claim 9, wherein the metal amalgam composition is disposed near a distal end of the radiation source.

13. A fluid treatment system, comprising:
a housing for receiving a flow of fluid, the housing comprising a fluid inlet, a fluid outlet, a closed fluid treatment zone disposed between the fluid inlet and the fluid outlet, and at least one elongate radiation source assembly having a longitudinal axis disposed in the fluid treatment zone substantially parallel to a direction of the flow of fluid through the housing; and
wherein the radiation source assembly comprises an elongate radiation source disposed in a protective sleeve to define a substantially annular passageway, the protective sleeve having opposed open ends configured to permit heat to exit the passageway and the housing through at least one of the opposed open ends of the sleeve,
wherein a proximal end of the radiation source comprises a first locator portion configured to position a proximal end of the radiation source to be substantially concentric with respect to a proximal end of the protective sleeve, and
wherein a distal end of the radiation source comprises a second locator portion configured to position a distal end of the radiation source to be substantially concentric with respect to a distal end of the protective sleeve.

14. The fluid treatment system defined in claim 13, wherein the second locator portion comprises a plurality of second finger portions to position a distal end of the radiation source to be substantially concentric with respect to a distal end of the protective sleeve.

15. The fluid treatment system defined in claim 13, wherein the second locator portion comprises an open region substantially aligned with a metal amalgam composition disposed on an interior of the radiation source.

16. The fluid treatment system defined in claim 15, wherein the open region has a shape comprising a closed perimeter.

17. The fluid treatment system defined in claim 15, wherein the open region has a shape comprising an open perimeter.

18. The fluid treatment system defined in claim 13, wherein the second locator portion comprises a pair movable sections configured to be movable between a first position in which the open region is obscured and a second position in which the open region is in a fully open position.

19. The fluid treatment system defined in claim 18, wherein the pair of movable sections is coaxially arranged and rotatable with respect to one another.

20. The fluid treatment system defined in claim 13, wherein the second locator portion comprises a pair movable sections configured to be movable between a first position in which the open region is obscured, at least one intermediate position in which the open region is partially open and a second position in which the open region is in a fully open position.

21. The fluid treatment system defined in claim 13, wherein the second locator portion comprises a pair movable sections configured to be movable between a first position in which the open region is obscured, a plurality of intermediate positions in which the open region is partially open and a second position in which the open region is in a fully open position.

22. The fluid treatment system defined in claim 21, wherein each of the movable sections comprises an open section.

23. The fluid treatment system defined in claim 22, wherein the open section in each movable section has substantially the same shape.

24. The fluid treatment system defined in claim 22, wherein the open section in each movable section has a different shape.

25. The fluid treatment system defined in claim 22, wherein the open section is configured such that the change in surface area of the open region from one intermediate position to another intermediate position is linearly dependent on the degree of relative movement of the movable sections.

26. The fluid treatment system defined in claim 22, wherein the open section is configured such that the change in surface area of the open region from one intermediate position to another intermediate position is non-linearly dependent on the degree of relative movement of the movable sections.

27. The fluid treatment system defined in claim 13, wherein the second locator portion comprises an end cap for receiving a distal end of the radiation source.

28. The fluid treatment system defined in claim 27, wherein the end cap is open.

29. The fluid treatment system defined in claim 27, wherein the end cap is closed.

* * * * *